US009069926B2

(12) United States Patent
Gupta et al.

(10) Patent No.: US 9,069,926 B2
(45) Date of Patent: *Jun. 30, 2015

(54) STANDARD CELLS HAVING TRANSISTORS ANNOTATED FOR GATE-LENGTH BIASING

(71) Applicant: Tela Innovations, Inc., Los Gatos, CA (US)

(72) Inventors: Puneet Gupta, Marina Del Ray, CA (US); Andrew B. Kahng, Del Mar, CA (US)

(73) Assignee: Tela Innovations, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/270,225

(22) Filed: May 5, 2014

(65) Prior Publication Data

US 2014/0245245 A1    Aug. 28, 2014

Related U.S. Application Data

(63) Continuation of application No. 13/620,669, filed on Sep. 17, 2012, now Pat. No. 8,949,768, which is a continuation of application No. 12/212,353, filed on Sep. 17, 2008, now Pat. No. 8,127,266, which is a (Continued)

(51) Int. Cl.
    *G06F 17/50*    (2006.01)
(52) U.S. Cl.
    CPC ........ *G06F 17/5081* (2013.01); *G06F 17/5063* (2013.01); *G06F 17/5068* (2013.01); *G06F 2217/78* (2013.01)
(58) Field of Classification Search
    USPC .............. 716/50–55, 118–119, 132–135, 139
    See application file for complete search history.

(56) References Cited

U.S. PATENT DOCUMENTS

| 5,619,420 A | 4/1997 | Breid |
| 5,880,967 A | 3/1999 | Jyu et al. |

(Continued)

FOREIGN PATENT DOCUMENTS

JP    2002258463 A    9/2002    ................ G03F 1/08

OTHER PUBLICATIONS

Wei, L. et al.; "Mixed-Vth CMOS Circuit Design Methodology for Low Power Applications"; 1999; ACM/IEEE Design Automation Conference.

(Continued)

*Primary Examiner* — Nghia Doan
(74) *Attorney, Agent, or Firm* — Martine Penilla Group, LLP

(57) ABSTRACT

Methods, layouts and chip design layouts that use annotations for communicating gate-length biasing amounts to post-layout tools are disclosed. One method includes receiving a chip design layout designed to includes select ones of a plurality of nominal cell layouts and an annotated cell layout. The chip design layout is defined by a plurality of layers and the plurality of nominal cell layouts define transistors, wherein each of the plurality of nominal cell layouts define nominal length transistors, and the annotated cell layout also defines transistors. The annotated cell layout is associated with an annotation layer that identifies a gate-length biasing to be applied to at least one transistor of the annotated cell layout. The gate-length biasing identifies an amount of change for a gate length and not width-sizing of a gate width of the at least one transistor of the annotated cell layout. The annotation layer is used to communicate design-specific directives that require implementation. The method uses a processor to process the chip design layout, with reference to the annotation layer, to apply the gate-length biasing to the annotated cell of the chip design layout.

30 Claims, 14 Drawing Sheets

Related U.S. Application Data continuation of application No. 11/145,025, filed on Jun. 3, 2005, now Pat. No. 7,441,211.

(60) Provisional application No. 60/678,694, filed on May 6, 2005.

(56) References Cited

U.S. PATENT DOCUMENTS

| | | | |
|---|---|---|---|
| 6,009,248 | A | 12/1999 | Sato et al. |
| 6,091,845 | A | 7/2000 | Pierrat et al. |
| 6,219,630 | B1 | 4/2001 | Yonezawa et al. |
| 6,369,412 | B1 | 4/2002 | Ueda et al. |
| 6,380,764 | B1 | 4/2002 | Katoh et al. |
| 6,425,115 | B1 | 7/2002 | Risler et al. |
| 6,567,972 | B1 | 5/2003 | Tanaka et al. |
| 6,581,028 | B1 | 6/2003 | Hayashi |
| 6,643,828 | B2 | 11/2003 | Naffziger et al. |
| 6,687,145 | B2 | 2/2004 | Houston |
| 6,691,285 | B1 | 2/2004 | Burden et al. |
| 6,734,521 | B2 | 5/2004 | Houston |
| 6,826,738 | B2 | 11/2004 | Cadouri |
| 6,883,156 | B1 | 4/2005 | Khainson et al. |
| 6,928,635 | B2 | 8/2005 | Pramanik et al. |
| 6,931,617 | B2 | 8/2005 | Sanie et al. |
| 6,954,918 | B2 | 10/2005 | Houston |
| 6,968,527 | B2 | 11/2005 | Pierrat |
| 6,993,741 | B2 | 1/2006 | Liebmann et al. |
| 6,996,787 | B2 | 2/2006 | Houston |
| 7,032,194 | B1 | 4/2006 | Hsueh |
| 7,149,999 | B2 | 12/2006 | Kahng et al. |
| 7,175,940 | B2 | 2/2007 | Laidig et al. |
| 7,222,328 | B2 | 5/2007 | Hasumi et al. |
| 7,302,672 | B2 | 11/2007 | Pack et al. |
| 7,350,183 | B2 | 3/2008 | Cui et al. |
| 7,367,008 | B2 | 4/2008 | White et al. |
| 7,424,694 | B2 | 9/2008 | Ikeda |
| 7,441,211 | B1 | 10/2008 | Gupta et al. |
| 7,480,880 | B2 | 1/2009 | Visweswariah et al. |
| 7,487,475 | B1 | 2/2009 | Kriplani et al. |
| 7,523,429 | B2 | 4/2009 | Kroyan et al. |
| 7,624,369 | B2 | 11/2009 | Graur et al. |
| 7,716,612 | B1 | 5/2010 | Gupta et al. |
| 7,730,432 | B1 | 6/2010 | Gupta et al. |
| 8,103,981 | B2 | 1/2012 | Kahng et al. |
| 8,127,266 | B1 | 2/2012 | Gupta et al. |
| 8,185,865 | B2 | 5/2012 | Gupta et al. |
| 8,490,043 | B2 * | 7/2013 | Gupta et al. .......... 716/132 |
| 8,635,583 | B2 * | 1/2014 | Gupta et al. .......... 716/139 |
| 8,756,555 | B2 * | 6/2014 | Gupta et al. .......... 716/133 |
| 2002/0073394 | A1 | 6/2002 | Milor et al. |
| 2003/0212966 | A1 | 11/2003 | Cadouri |
| 2003/0229881 | A1 | 12/2003 | White et al. |
| 2005/0188336 | A1 | 8/2005 | Mortensen et al. |
| 2005/0216877 | A1 | 9/2005 | Pack et al. |
| 2006/0101370 | A1 | 5/2006 | Cui et al. |
| 2007/0150847 | A1 | 6/2007 | Ikeda |
| 2007/0234252 | A1 | 10/2007 | Visweswariah et al. |
| 2008/0046846 | A1 | 2/2008 | Chew et al. |
| 2008/0127029 | A1 | 5/2008 | Graur et al. |
| 2008/0148216 | A1 | 6/2008 | Chan et al. |
| 2009/0024974 | A1 | 1/2009 | Yamada |
| 2009/0055788 | A1 | 2/2009 | Cote et al. |
| 2009/0077524 | A1 | 3/2009 | Nagamura et al. |
| 2009/0106714 | A1 | 4/2009 | Culp et al. |
| 2010/0023917 | A1 | 1/2010 | Kahng et al. |

OTHER PUBLICATIONS

Wei, L. et al.; "Power Minimization by Simultaneous Dual-Assignment and Gate-Sizing"; 2000; ACM/IEEE 200 Custom Integrated Circuits Conference, pp. 413-416.

Weste et al., "Principles of CMOS VLSI Design", $2^{nd}$ edition, 1993.

Yang, Chiang; "Challenges of Mask Cost & Cycle Time"; Oct. 1, 2001; Intel.

Ye, Y. et al.; "A New Technique for Standby Leakage Reduction in High-Performance Circuits"; 1998; Symposium on VLSI Circuits.

Y. Tsai, "Influence of Leakage Reduction Techniques on Delay/Leakage Uncertainty," pp. 1-6, 2005; Dept. of Computer Science and Eng., Penn State University, PA. Proc. of the $18^{th}$ Int'l Conf. on VLSI Design held with $4^{th}$ Int'l Conf. on Embedded Systems Design (VLSID '05); 1063-9667/05 2005 IEEE.

Dracula Reference, pp. 1-1358, Product Version 4.9, Dec. 2002, pub. by Cadence Design Systems, Inc.

Agrawa, A. et al.; "Leakage in Nano-Scale Technologies: Mechanisms, Impact and Design Considerations"; 2004; ACM/IEEE Design Automation Conference.

Agrawa, A. et al.; "Statistical Timing Analysis Using Bounds and Selective Enumeration"; 2003; IEEE.

Axelrad et al. "Efficient Full_Chip Yield Analysis Methodology for OPC-Corrected VLSI Design", First International Symposium on Quality of Electronic Design, Mar. 20-22, 2000.

Beeftink, F. et al.; "Combinatorial Cell Design for CMOS Libraries"; 2000; Integration, the VLSI Journal.

Brokar, S. et al.; "Parameter Variations and Impact on Circuits and Microarchitecture"; 2003; ACM/IEEE Design Automation Conference.

Bruggeman et al.; "Microlithography Cost Analysis"; Nov. 14-16, 1999; Arch Microlithography Symposium.

Gupta, P. et al.; "Joining the Design and Mask Flows for Better and Cheaper Masks"; Sep. 2004; Proc. 24th BACUS Symposium on Photomask Technology and Management.

Gupta, P. et al.; "Selective Gate-Length Biasing for Cost-Effective Runtime Leakage Control"; 2004; ACM/IEEE Design Automation Conference.

Halter, J. et al.; "A Gate-Level Leakage Power Reduction Method for Ultra Low Power CMOS Circuits"; 1997; IEEE Custom Integrated Circuits Conference.

Horiguchi, I. et al.; "Switched-Source-Impedance CMOS Circuit for Low Standby Sub-Threshold Current Giga-Scale LSI's"; 1993; IEEE Journal of Solid-State Circuits.

http://mentor.com/calibre/datasheets/opg/html/, "Mentor Calibre" (2011-2013).

http://www.kla-tencor.com; "Prolith" (Copyright 2010).

http://www.opencores.org/projects/; "Opencores.org", Feb. 25, 2010.

http://public.itrs.net/"International_Technology_Roadmap_for_Semiconductor; Dec. 2001: (15 articles).

http://www.synopsys.com;copyright.html; "Design Compiler Graphical"; 2009.

http://www.synopsys.com;copyright.html; "Design Compiler Ultra"; 2009.

http:/www.eetimes,com/news/design/features/showArticle.jhtml?articleID=47102054; Manufacturing-Aware Design Helps Boost IC Yield, Sep. 9, 2004.

Im, Hyunsik et al.; "VTCMOS Characteristics and its Optimum Conditions Predicted by a Compact Analytical Model"; 2001; International symposium on Low Power Electronics and Design.

Kao, J. et al.; "MTCMOS Hierarchical Sizing Based on Mutual Exclusive Discharge Patterns"; 1998; ACM/IEEE Design Automation Conference.

Kawamoto et al.; "The Outlook for Semiconductor Processes and Manufacturing Technologies in the 0.1-μm Age"; 1999; Hutachi Review vol. 48.

Ketkar, M. et al.; "Standby Power Optimization via Transistor Sizing and Dual Threshold Voltage Assignment"; 2002; IEEE International Conference on Computer Aided Design.

Kim et al., "Leakage Current: Moore's Law Meets Static Power", *Computer*, Dec. 2003, pp. 68-75, Ann Arbor, MI.

Kinnison, Robert R.; "Applied Extreme Value Statistics"; 1985; Battelle Press.

Lee, D. et al.; "Static Leakage Reduction Through Simultaneous Threshold Voltage and State Assignment"; 2003; ACM/IEEE Design Automation Conference.

Lopez Martin, Antonio J., "Tutorial Cadence Design Environment", dated Oct. 2002.

Cao, Y. et al; "Design Sensitivities to Variability: Extrapolations and Assessments in Nanometer VLSI"; 2002; IEEE ASIC/SOC.

(56) References Cited

OTHER PUBLICATIONS

Carpenter, Wally; "International SEMATECH: A Focus on the Photomask Industry"; Autumn 2000; Yield Management Solutions.
Chuang et al.; "Delay and Area Optimization for Discrete Gate Sizes Under Double-Sided Timing Constraints";1993; IEEE Xustom Integrated Circuits Conference.
Clark, L. et al. "Managing Standby and Active Mode Leakage Power in Deep Sup-Micron Design" Proceedings IEEE International Symposium on Low Power Electronic Design, 2004.
Dunlop et al.; "Experiments Using Automatic Physical Design Techniques for Optimizing Circuit Performance"; 1990; IEEE International Symposium on Circuits and Systems.
Gupta P. et al. "Manufacturing-Aware Physical Design", 2003 IEEE/ACM International Conference on Computer-Aided Design, Nov. 11-13, 2003, Los Angels, CA.
Murphy, Scott; "Mask Supply Workshop"; Oct. 1, 2001; International SEMATECH; http://internationalsematech.org/meetings/archives/litho/mask/20011001/G_DPI%20Scott%20Murphy.pdf.
Mutoh, S. et al.; "1-V Power Supply High-Speed Digital Circuit Technology with Multithreshold-Voltage CMOS"; 1995; IEEE Journal of Solid-State Circuits.
Mutoh, S. et al.; "A 1V Multithreshold-Voltage CMOS Digital Signal Processor for Mobile Phone Application" 1996; IEEE Journal of Solid-State Circuits.
Nair et al.; "Generation of Performance Constraints for Layout"; Aug. 1989; IEEE Transactions on Computer-Aided Design.
Narendra, S. et al.; "Leakage Issues in IC Design: Trends, Estimation and Avoidance"; 2003; IEEE International Conference on Computer Aided Tutorial.
Nose, K. et al.; "Vth Hopping Scheme to Reduce Subthreshold Leakage for Low=Power Processors" 2002; IEEE Journal of Solid-State Circuits.
Rao et al.; "Statistical Analysis of Subthreshold Leakage Current for VLSI Cirsuits"; Feb. 2004; IEEE Transactions on Very Large Scale Integration (VLSI) Systems, vol. 12, No. 2.
Rieger et al.; "Layout Design Methodologies for Sub-Wavelength Manufacturing" Jun. 18-22, 2001; ACM.
Rogenmoser et al., "*Stochastic Methods for Transistor Size Optimization of CMOS VLSI Circuits*", Parallel Problem Solving from Nature-PPSN IV Lecture Notes in Computer Science, 1996, vol. 1141/1996, Zurich, Switzerland.
Sarrafzadeh et al.; "A Delay Budgeting Algorithm Ensuring Maximum Flexibility in Placement"; Nov. 1997; IEEE Transactions on Computer-Aided Design of Integrated Circuits and Systems.
Sato, K. et al., "Post-Layout Optimization for Deep Submicron Design", Advanced CAD Development Laboratories, $33^{rd}$ Design Automation Conference, 1966 ("Sato").
Schroder, D. K. et al; "Negative Bias Temperature Instability: Road to Cross in Deep Submicron Silicon Semiconductor Manufacturing"; 2003; Journal of Applied Physics.
Shigematsu, S. et al.; "A 1-V High-Speed MTCMOS Circuit Scheme for Power-Down Applications Circuits"; 1997; IEEE Journal of Solid-State Circuits.
Sirichotiyakul, S. et al.; "Duet: An Accurate Leakage Estimation and optimization Tool for Dual-Vth Circuits" 2002; IEEE Transactions on Very Large Scale Integrated Systems.
Sirichotiyakul, S. et al.; "Stand-by Power Minimization through Simultaneous Threshold Voltage Selection and Circuit Sizing"; 1999; ACM/IEEE Design Automation Conference.
Sirisantana, N. et al.; "High-Performance Low-Power CMOS Circuits Using Multiple Channel Length and Multiple Oxide Thickness"; 2000; International Conference on Computer Design.
Sreedhar, A. et al. "Statistical Yield Modeling for Sub-Wavelength Lithography", University of Massachusetts at Amherst, Department of Electrical & Computer Engineering, Test Conference, 2008, IEEE.
Srivastava et al., "*Statistical Optimization of Leakage Power Considering Process Variations Using Dual-Vth and Sizing*", DAC 2004, Jun. 7-11, 2004, Ann Arbor, MI.
Tsai et al., "*Influence of Leakage Reduction Techniques on Delay/Leakage Uncertainty*", Proceedings of the $18^{th}$ Int'l Conf. on VLSI Design held jointly with $4^{th}$ Int'l Conf. on Embedded Systems Design (VLSID '08), Jan. 3-7, 2005, Penn State University, PA.

\* cited by examiner procedure $L_{Gate}Biasing$
1   Run SSTA to initialize $s_p$ $\forall$cell instances, $p$
2   $S \leftarrow \{\}$
3   forall cell instances, $p$
4       $P_p \leftarrow ComputeSensitivity(p)$
5       $S \leftarrow S \cup P_p$
6   do
7       $P_{p^*} \leftarrow \max(S)$
8       if($P_{p^*} \leq 0$)
9           exit
10      $S \leftarrow S - \{P_{p^*}\}$
11      $SaveState()$
12      Downsize cell instance $p^*$
13      $EISTA(p^*)$
14      if($TimingViolated()$)
15          $RestoreState()$
16      else
17          $N \leftarrow p^* \cup$ fan-in and fan-out nodes of $p^*$
18          forall $q \in N$
19              if($P_q \in S$)
20                  $P_q \leftarrow ComputeSensitivity(q)$
21                  Update $P_q$ in $S$
22  while($|S| > 0$)

procedure $ComputeSensitivity(q)$
1   $old\_slack \leftarrow$ Slack on cell instance $q$
2   $old\_leakage \leftarrow$ Leakage of cell instance $q$
3   $SaveState()$
4   Downsize cell instance $q$
5   $CISTA(q)$
6   $new\_slack \leftarrow$ Slack on cell instance $q$
7   $new\_leakage \leftarrow$ Leakage of cell instance $q$
8   $RestoreState()$
9   return $(old\_leakage - new\_leakage)/(old\_slack - new\_slack)$

FIG. 5

STANDARD CELLS HAVING TRANSISTORS ANNOTATED FOR GATE-LENGTH BIASING

CLAIM OF PRIORITY TO RELATED APPLICATION

This application is a continuation and claims priority under 35 U.S.C. §120, from pending U.S. patent application Ser. No. 13/620,669, filed on Sep. 14, 2012, which claims priority from U.S. patent application Ser. No. 12/212,353 (now U.S. Pat. No. 8,127,266), filed on Sep. 17, 2008, which claims priority from U.S. patent application Ser. No. 11/145,025, filed on Jun. 3, 2005 (now U.S. Pat. No. 7,441,211), which claimed priority from U.S. Provisional Patent Application No. 60/678,694, filed on May 6, 2005. Each of the above-identified applications are incorporated herein by reference.

BACKGROUND OF THE INVENTION

1. Field of the Invention

This invention relates generally to optimization of digital integrated circuits, and, more particularly, to small gate-length biasing of transistors to improve performance characteristics.

2. Description of the Related Art

Modern-day digital integrated circuits are complex devices that often must meet high performance standards. Due to their complexity, the design and simulation of integrated circuits is also a complex task. Furthermore, the modern-day manufacture of integrated circuits has now reached minimum feature sizes that are down into the nanometer scale. Each new technology generation brings ever-tighter requirements for manufacturing process control. As a result, there is a demand for approaches that can improve the performance characteristics of integrated circuits, preferably with it disruption to existing design and manufacturing process.

For example, power consumption is one aspect of circuit performance. High power dissipation in integrated circuits shortens battery life, reduces circuit performance and reliability, and has a large impact on packaging costs. Power in complementary metal oxide semiconductor (CMOS) circuits consists of a dynamic component and a static component, which is primarily due to leakage currents. While lowered supply voltages (and consequently lowered threshold-voltages) and aggressive clock gating can achieve dynamic power reduction, these techniques typically increase leakage power and therefore cause its share of total power to increase. Manufacturers face the additional challenge of leakage variability: recent data indicates that leakage of microprocessor chips from a single 180 nm wafer can vary by as much as 20×. Thus, leakage power has become an important design concern for the system-level chip designer since it is becoming an ever-increasing component of total dissipated power, with its contribution projected to increase from 18% at 130 nm to 54% at the 65 nm node.

Leakage current is generally composed of three major components: (1) subthreshold leakage, (2) gate leakage, and (3) reverse-biased drain-substrate and source-substrate junction band-to-band tunneling leakage. The reverse-biased diode junction leakage does not depend on gate-length (also called channel length), gate leakage is linearly proportional to gate-length, and subthreshold leakage has an exponential dependence on gate-length. Subthreshold leakage, which is also proportional to operating temperature, is usually the dominant contributor to total leakage at 130 nm and is likely to remain so in the future. This is especially true since gate leakage, which has only a small dependence on temperature, is often much reduced compared to subthreshold leakage in technologies using thick gate insulator thicknesses or high dielectric constant insulators, which is likely the case for technology nodes less than 65 nm.

Another leakage source is gate induced drain leakage (GIDL), which is primarily due to minority carriers in drain depletion region. GIDL is important primarily for moderately doped drains, since lightly doped drain (LDD) regions do not have high enough electric fields to trigger GIDL. LDD regions should not narrow due to channel length increases. Additionally, GIDL is a strong function of channel width and oxide thickness but not channel length. GIDL largely depends on the gate-drain overlap region, which does not change with changes in channel length.

Proposed techniques for leakage power reduction generally include the use of multiple supply ($V_{dd}$ and $V_{ss}$) and gate threshold ($V_{th}$) voltages, and the assignment of input values to inactive gates such that leakage is minimized. Such leakage reduction methodologies can be divided into two classes depending on whether they reduce standby leakage or runtime leakage. Standby techniques reduce leakage of devices that are known not to be in operation, while runtime techniques reduce leakage of active devices.

Several techniques have been proposed for standby leakage reduction. Body biasing or VTMOS-based approaches dynamically adjust the device $V_{th}$ by biasing the body terminal. This technique has also been used to reduce leakage of active devices. Multi-threshold CMOS (MTCMOS) techniques use high-$V_{th}$ CMOS (or NMOS or PMOS) devices to disconnect one or both of $V_{dd}$ or $V_{ss}$ from logic circuits implemented using low $V_{th}$ devices in standby mode. In source biasing, a positive bias is applied in standby state to source terminals of off devices. Other techniques include the use of transistor stacks and the use of input-vector control. Among the drawbacks of these techniques are increased logic design complexity, circuit layout area overhead, and the coarse-grained nature of the resulting power reductions.

Currently, to the inventors' knowledge, the primary mainstream approach to runtime leakage reduction is the multi-$V_{th}$ manufacturing process. One drawback to this technique is the rise in process costs due to additional steps and masks. However, the increased costs have been outweighed by the resulting leakage reductions and multi-$V_{th}$ processes are common. One complication facing the multi-$V_{th}$ approach is the increased variability of $V_{th}$ for low-$V_{th}$ devices. This occurs in part due to random doping fluctuations, as well as worsened drain induced barrier lowering (DIBL) and short-channel effects (SCE) in devices with lower channel doping. The larger variability in $V_{th}$ degrades the achievable leakage reductions of multi-$V_{th}$ approaches and worsens with continued MOS scaling. Moreover, multi-$V_{th}$, methodologies do not offer a smooth tradeoff between performance and leakage power. Devices with different $V_{th}$ typically have a large separation in terms of performance and leakage, for instance a 15% speed penalty with a 10× reduction in leakage for high-$V_{th}$ devices.

Gate-length ($L_{Gate}$) also affects device leakage currents. Large changes to gate-lengths, however, even in devices within non-critical gates, result in heavy delay and dynamic power penalties. Large changes would also necessitate large changes in design methodology, for example, potentially significant changes in design rules. In addition, cell layouts with large changes to gate-lengths are not layout-swappable with their nominal versions, resulting in substantial engineering change order (ECO) overheads during layout. Moreover, traditional sizers, which focus on width-sizing or multi-$V_{th}$ processes for optimization, perform poorly with gate-length sizing because it is fundamentally different than width sizing.

Thus, there is a need to improve digital circuits, for example, by reducing leakage current and thus leakage power, while minimally impacting delay performance and/or design and manufacturing processes.

SUMMARY OF THE INVENTION

The present invention overcomes the limitations of the prior art by providing small biasing of device gate-lengths, preferably in a manner that has low impact on existing design and/or manufacturing processes. For example, biasing of device gate-lengths affords an additional design space to reduce chip leakage power and its variability. Typically, leakage power decreases exponentially, and delay increases linearly, with increasing gate-length. Thus, it is possible to increase gate-length only marginally to take advantage of the exponential leakage reduction, while impairing time delay performance only linearly. From a design flow standpoint, the use of only slight increases in gate-length can preserve pin- and layout-compatibility. Therefore, the technique can be applied, for example, as a post-layout enhancement step. Application of gate-length biasing, primarily to those devices that do not appear in critical paths, can achieve zero or negligible degradation in delay characteristics for the chip.

In an exemplary embodiment, the gate-length biasing methodology includes optimizing a circuit by adjusting a nominal gate-length of a transistor by a small bias length. The small bias length may be, for example, less than 10% of the nominal gate-length or less than a predefined fraction of the nominal gate-length. The bias length may be determined by evaluating a design tradeoff, such as leakage power versus circuit delay. The gate-length biasing methodology may be applied, for example, at a cell level or a transistor level. The transistor may be part of a cell that is in a non-critical timing path, or part of a cell that has asymmetrical timing arcs. The nominal cell to replace may be identified, for example, using a sensitivity-based downsizing approach, or a sensitivity-based upsizing approach, or a combination thereof.

Small gate-length biasing can also be used for various other purposes. For example, it may be used to reduce various types of power consumption (e.g., total power, static power or dynamic power), preferably in a manner that has minimal or zero impact on timing delays. Decreasing gate-lengths of certain devices can reduce time delays or increase the operating frequency of the chip. Gate-length biasing may also be used to increase the on-chip signal integrity. As a final example, gate-length biasing may be used for manufacturability purposes: for example, to increase the reliability or manufacturability of the chip. The amount and sign of the biasing and the specific transistors to be biased will depend in part on the purpose of the biasing. Biasing can be positive (to longer gate-lengths) or negative (to shorter gate-lengths), depending on the application.

In an exemplary embodiment, the gate-length biasing methodology may be implemented, for example, by generating an enhanced library including a biased variant(s) of a nominal cell, where a biased transistor in the biased variant corresponds to a nominal transistor in the nominal cell. The biased transistor includes a biased gate-length where the bias length is small compared to a nominal gate-length of the nominal transistor. In an exemplary embodiment, the biased variant remains pin-compatible with the nominal cell.

In another exemplary embodiment, the gate-length biasing methodology may be implemented using optical proximity correction to apply the small bias length to particular transistors in a nominal layout. The implementation may include one or more of, for example, shifting a required error tolerance, applying a starting edge offset, using a maximum error tolerance, accounting for iso-dense layout effects, or other techniques.

In another exemplary embodiment, the gate-length biasing methodology may be implemented using an electronic design automation (EDA) tool, for example, a design rule checker, to generate a biased layout including the small bias length applied to one or more transistors.

Other aspects of the invention include devices and systems corresponding to the methods and embodiments described above, and digital circuits produced by these methods.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 5 is the pseudocode for an exemplary embodiment of a leakage optimization implementation.

DETAILED DESCRIPTION OF THE PREFERRED EMBODIMENTS

Gate-Length Biasing Methodology

Novel approaches using small gate-length ($L_{Gate}$) biasing, usually (but not always) increases in $L_{Gate}$, for device and circuit optimization, and preferably having minimal impact on circuit performance and manufacturing costs, are described. The terms "gate-length biasing" and "$L_{Gate}$ biasing" are used interchangeably to refer to the proposed technique. The phrase "biasing a device" implies adjusting the gate-length of the device slightly. The term "nominal gate-length" refers to the gate-length of an unbiased device. The methodology may be used, for example, to optimize (e.g., reduce) runtime leakage power. The following examples are based on the goal of reducing leakage power (and, as a result, the gate-length biasing usually results in an increase in gate-lengths), but it should be recognized that gate-length biasing is not limited to this particular application or to increases in gate-length.

Figure 1:
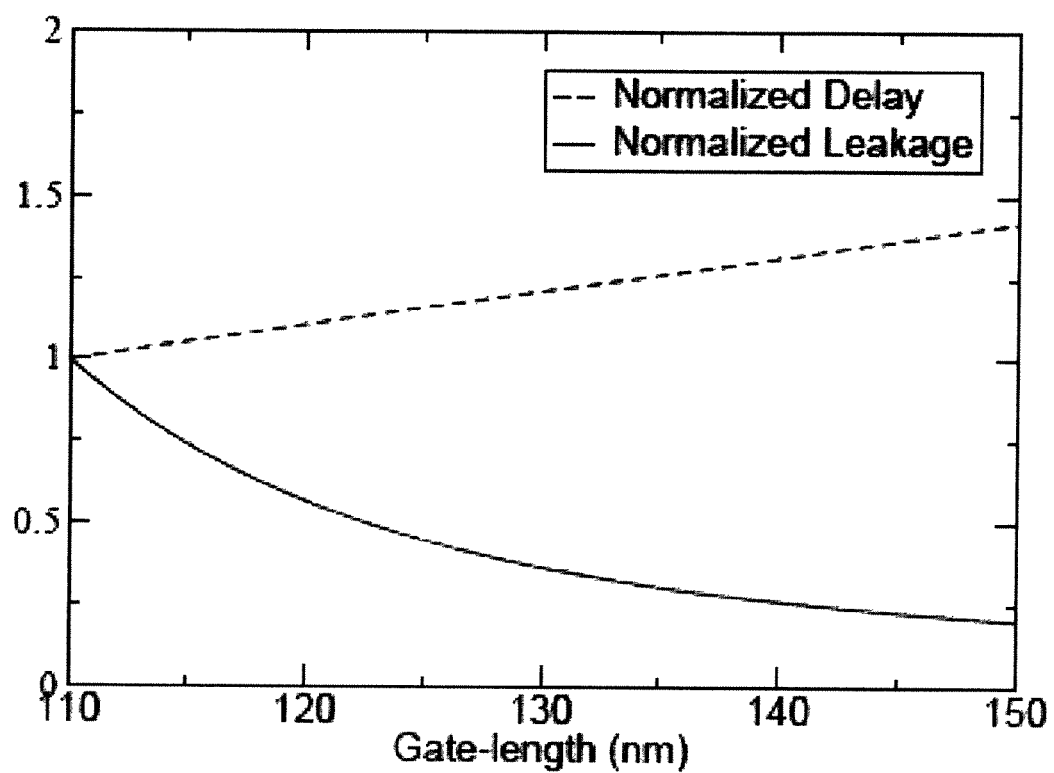
FIG. 1 is a graph of the variation of delay and leakage with gate-length for an industrial 130 nm process.

One advantage of this technique is that small increases in gate-length can have significant effects on device characteristics such as leakage current reduction since they take significant advantage of the SCE and incur only small penalties in drive current and input capacitance. Typically, leakage power decreases exponentially, and delay increases linearly, with increasing gate-length. For example, FIG. 1 is a graph of the variation of delay and leakage with gate-length for an industrial 130 nm process. FIG. 1 shows the advantage to be gained, in particular, leakage reduction for minimal delay penalty, by slight increases in gate-length. Leakage current flattens out with gate-length beyond 140 nm, making $L_{Gate}$ biasing less desirable in that range.

Figure 2A:
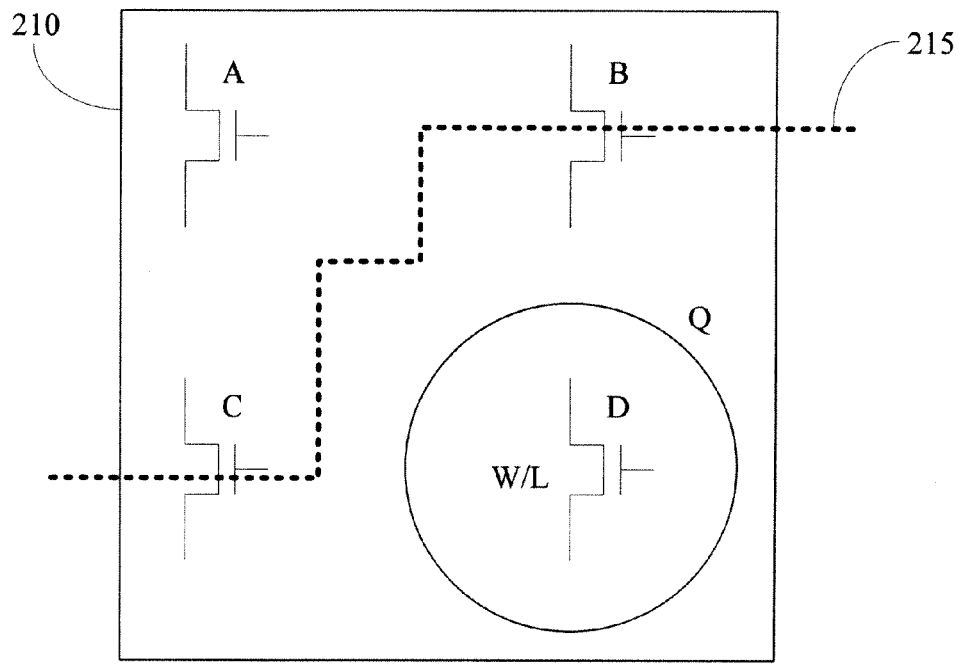
FIGS. 2A and 2B are a conceptual representation of a gate-length biasing methodology in accordance with the present invention.
Figure 2B:
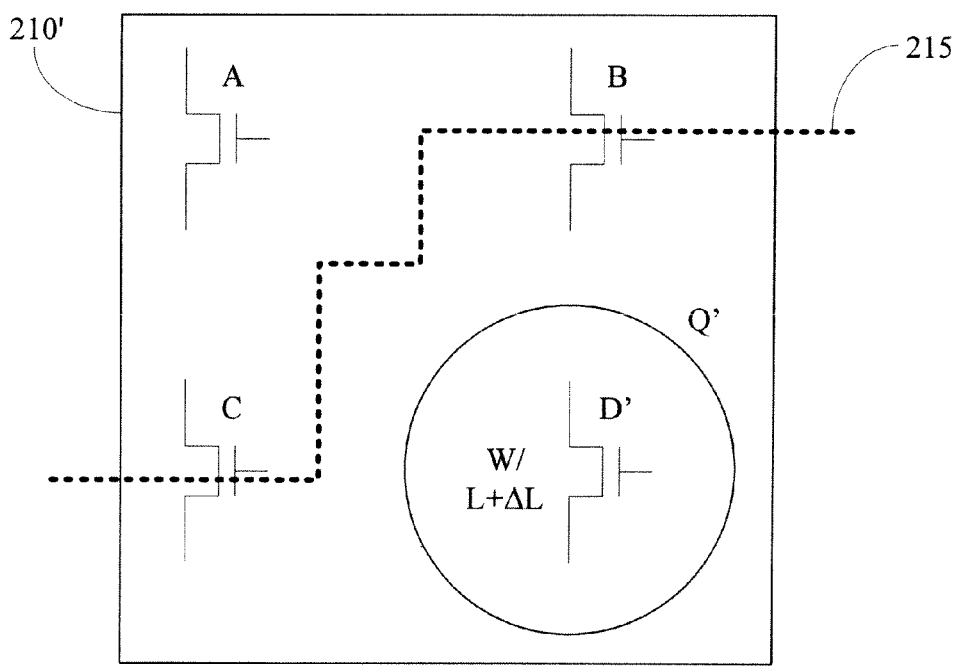

FIGS. 2A and 2B are a conceptual representation of a gate-length biasing methodology in accordance with the present invention. FIG. 2A is a conceptual representation of an unbiased circuit 210. Unbiased circuit 210 includes transistors A, B, C, and D, where transistor D has width W and length L. FIG. 2B is a conceptual representation of a biased circuit 210', which is circuit 210 of FIG. 2A after application of the gate-length biasing method of the present invention. Biased circuit 210' includes unbiased transistors A, B, and C of circuit 210. However, transistor D of unbiased circuit 210 has been replaced by transistor D' in biased circuit 210'. Transistor D' has width W and length L+ΔL.

The gate-length biasing technique of the present invention may be applied, for example, at the cell level or at the transistor level. At the cell level, in an exemplary embodiment, the approach enhances a standard cell library by adding $L_{Gate}$ biased variants to the library. For example, as shown in FIG. 2A, transistor D is part of cell Q in the unbiased circuit 210. In biased circuit 210' of FIG. 2B, however, cell Q has been replaced by cell Q', which is a biased variant of cell Q and includes transistor D'. In an exemplary embodiment, the gate-length biasing methodology is applied primarily to devices in non-critical timing paths, to optimize device characteristics. A critical timing path 215, which does not include transistors D or D', is shown in FIGS. 2A and 2B. For example, in the context of leakage reduction, a leakage optimization approach is used to incorporate slower, low-leakage cells into non-critical paths, while retaining faster, high-leakage cells in critical paths.

On the other hand, at the transistor level, since different transistors control different timing arcs of a cell, an exemplary embodiment of gate-length biasing at the transistor level includes individually modifying delays of different timing arcs. Asymmetry in timing criticality of different timing arcs of a cell instance in a circuit, and that of rise and fall transitions, can be used by transistor level gate-length biasing to yield significant leakage savings. For example, any of the transistors in FIG. 2A or 2B might be replaced with a corresponding biased variant as a result of applying the gate-length biasing methodology at the transistor level. Alternatively, different biased variants of cell Q may be generated based on different timing arcs, and then cell Q is replaced by the appropriate biased version Q' in circuit 210'.

The gate-length biasing methodology can provide several advantages and benefits. One potential benefit of the gate-length biasing methodology is that if a gate-length bias is less than the pitch of the layout grid, the biased design generally avoids design rule violations. This allows optimization without costly redesign. Moreover, it implies that the biased and unbiased cell layouts are pin-compatible and hence layout-swappable. This allows gate-length biasing-based optimization to be possible at any point in a design flow, unlike sizing-based methods.

Other potential benefits of the gate-length biasing methodology, in the context of leakage power optimization, are significant leakage reduction and minimal or zero delay penalty. Test cases showed that with a biasing of 8 nm in a 130 nm process, leakage reductions of 24% to 38% were achieved for a set of the most commonly used cells with a delay penalty of under 10%. Using simple sizing techniques, other test cases showed 33% leakage savings with less than 3% dynamic power overhead and no delay penalty. These phenomena are not restricted, however, to the 130 nm node, and similar benefits are likely for other process nodes as well.

Another potential benefit of the gate-length biasing methodology is a choice of biasing strategies. Exemplary embodiments of the gate-length biasing methodology include a cell-level biasing methodology and a transistor-level methodology. Further optimization may be obtained by using transistor-level gate-length biasing in conjunction with cell-level gate-length biasing. In a comparison of gate-length biasing at the cell-level and at the transistor-level in the context of leakage reduction, test cases showed transistor-level gate-length biasing can further reduce leakage by up to 10% but requires a potentially significantly larger library. As a result of this tradeoff, in one approach, transistor-level biasing is done for only the most frequently used cells such as inverters, buffers, NAND, and NOR gates. Fortunately, the most frequently used cells have one or two inputs and hence only a small number of variants need be characterized for them. To further reduce library size, only one of the cell variants in which different logically equivalent inputs are fast may be retained, and pin-swapping techniques can be used during leakage optimization.

Another potential benefit of the gate-length biasing methodology is that the devices with biased gate-length may be more manufacturable and may have a larger process margin than the nominal devices. Biasing typically does not require extra process steps, unlike multiple-threshold based leakage optimization methods.

Another potential benefit is that gate-length biasing can lead to more process-insensitive designs, for example, leakage variability reduction. Since the sensitivity of leakage to gate-length reduces with increased gate-length, a fixed level of variability in gate-length translates to reduced variability in leakage. Leakage variability may occur, for example, due to dopant variation, voltage supply variation, and temperature variation. Dopant variation results in threshold variation, which can cause not only leakage variation, but also timing changes. Dopant fluctuation is inversely proportional to the square root of the gate area. Increasing the gate-length slightly results in a slightly increased gate area and thus reduced threshold and leakage variation. Additionally, multi-gate-length designs, e.g., a design including nominal and biased gate-lengths, track supply voltage variation better than multi-threshold voltage designs, also leading to reduced leakage variation. In particular, test cases showed that gate-length biased designs can have 41% less leakage worst-case variability in presence of inter-die variations as compared to nominal gate-length designs. In presence of both inter- and intra-die critical dimension variations, this implies selective gate-length biasing may yield designs less sensitive to variations.

Other potential benefits of the gate-length biasing methodology include ease of use and potential for further optimization by using the methodology in conjunction with other techniques for further benefit. The use of more than two gate-lengths, for example, for the most commonly used cells, along with improved sizing techniques, or other common optimization techniques, is likely to yield further optimization, such as better leakage savings. In particular, in the context of leakage reduction, further reductions in leakage are possible by applying gate-length biasing after first applying the multi-threshold voltage technique, which is widely used for leakage reduction.

As an example of the benefits available from applying the gate-length biasing methodology to a process with multi-$V_{th}$, an advanced low power process may yield products that have an off current ($I_{off}$) for high-$V_{th}$ devices of less than 20 pA/μm, with a portion of $I_{off}$ due to junction leakage that is not affected by gate-length biasing, and three orders of magnitude delta between active and standby currents. An $I_{off}$ of 20 pA/μm indicates that the leakage power budget is quite small and that leakage is always a concern. Also, the three orders of magnitude difference is quite large, indicating room for further optimization. Thus, even though the design process starts with a multi-$V_{th}$ library first, gate-length biasing can still play a significant role in the low power design flow.

The gate-length biasing methodology could exploit the design spaces offered by considering the overall distribution of power consumption (e.g., including transponder power) and sensitivities to both standby and total power by, for example, constraining the biasing so as to not increase total power, etc. In particular, the gate-length biasing methodology may apply an optical proximity correction (OPC) guidance "knob" (discussed in more detail infra), not available in standard multi-$V_{th}$ processes, to achieve improved robustness and silicon quality. Also, the gate-length biasing methodology provides a "granularity" win. In particular, conventional critical dimension (CD) biases on nominal or low-$V_{th}$ devices are inserted to gain speed but they also push leakage up substantially beyond the 20 pA/μm value. Instead of discretely jumping from 20 pA/μm to nA leakage levels with the corresponding 30% speed boost, a conventional low power process could include a larger $L_{Gate}$ and nominal- or low-$V_{th}$ combination to create a finer tradeoff of speed versus leakage. Lastly, no matter how small the high-$V_{th}$ device leakage is, the gate-length biasing methodology typically provides further reduction in leakage. Gate-length biasing of high-$V_{th}$ devices can be valuable because there are often many high-$V_{th}$ devices because the sizer begins with high-$V_{th}$, and a large percentage of high-$V_{th}$ devices can be biased because of large slack on many paths even after $V_{th}$ assignment. For these reasons, significant leakage savings are possible. This highlights the value of the gate-length biasing technique, since further reductions in leakage are realizable using both optimization methods in conjunction with each other.

The gate-length biasing methodology may also yield further benefit to a process that already includes multiple gate-lengths. For example, the gate-length biasing methodology may provide one or more of: essentially continuous gate-length sizing without increased mask layers, topology based transistor level biasing, OPC error biasing, biasing with awareness of iso-dense effects, and other benefits. Each of these benefits can lead to further optimization than is available with a multiple gate-length process alone.

The following sections include further descriptions of exemplary approaches to small increases in gate-length (e.g., referred to simply as $L_{Gate}$ biasing), including the following. Cell-level and transistor level gate-length biasing methodologies, which may be based, for example, on less than 10% increases in drawn $L_{Gate}$ of devices and may be used to address leakage reduction, are discussed. Experiments and results showing benefits of cell-level and transistor-level $L_{Gate}$ biasing methodologies in different design scenarios such as dual-$V_{th}$ are also discussed. An analysis of potential benefits and caveats of such biasing methodologies, including some possible implications for lithography and process variability, is presented. Lastly, various implementation methods for gate-length biasing are presented.

Figure 3:
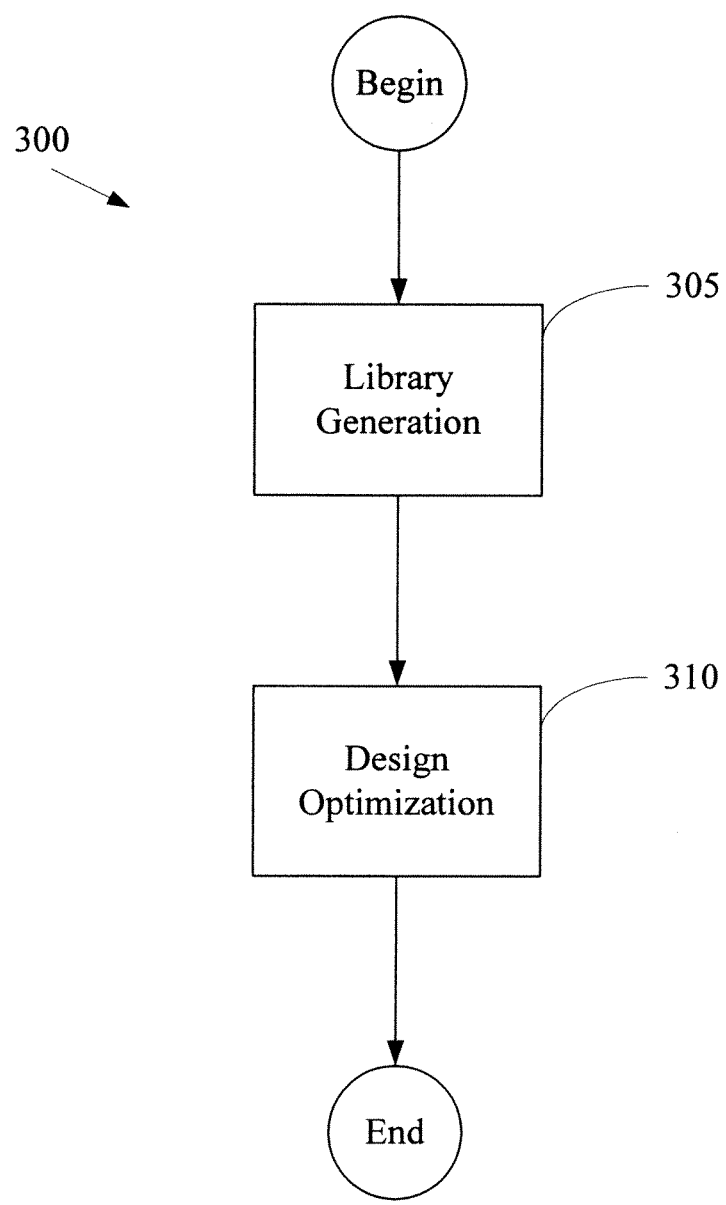
FIG. 3 is a flow chart of an exemplary embodiment of an $L_{Gate}$ biasing methodology in accordance with the present invention.

FIG. 3 is a flow chart of an exemplary embodiment of an $L_{Gate}$ biasing methodology 300 in accordance with the present invention. A cell is a circuit comprised of one or more transistors configured to perform some function, such as a NAND cell, an inverter, a buffer, or other circuit. Libraries are collections of such cells. System-level chip designers may choose a variety of cells from a library to design a particular chip, such as a microprocessor or microcontroller. The current-voltage characteristics of the transistors in a cell are determined by the device's properties, such as gate width, gate-length, insulator thickness, and doping concentrations, among other properties. These properties are generally optimized for a particular technology node; for example, a 130 nm node describes a technology based upon a nominal gate-length of 130 nm. Further perturbations, however, made to some of these properties, for example, gate-length biasing, can be used to further optimize performance for particular designs.

In the exemplary embodiment of FIG. 3, the method 300 begins with library generation 305 in which a standard cell library is enhanced by adding $L_{Gate}$ biased variants to the library. Next, design optimization 310 of a circuit containing the standard cells is performed. In an exemplary embodiment, design optimization 310 entails leakage reduction, in which leakage optimization is performed to incorporate slower, low-leakage cells (i.e., $L_{Gate}$ biased cells) into non-critical paths, while retaining faster, high-leakage cells in critical paths. A significant benefit of method 300 is that it may be used in conjunction with other optimization techniques, such as the multi-threshold voltage technique, which is widely used for leakage reduction.

Cell-Level Gate-Length Biasing

Figure 4A:
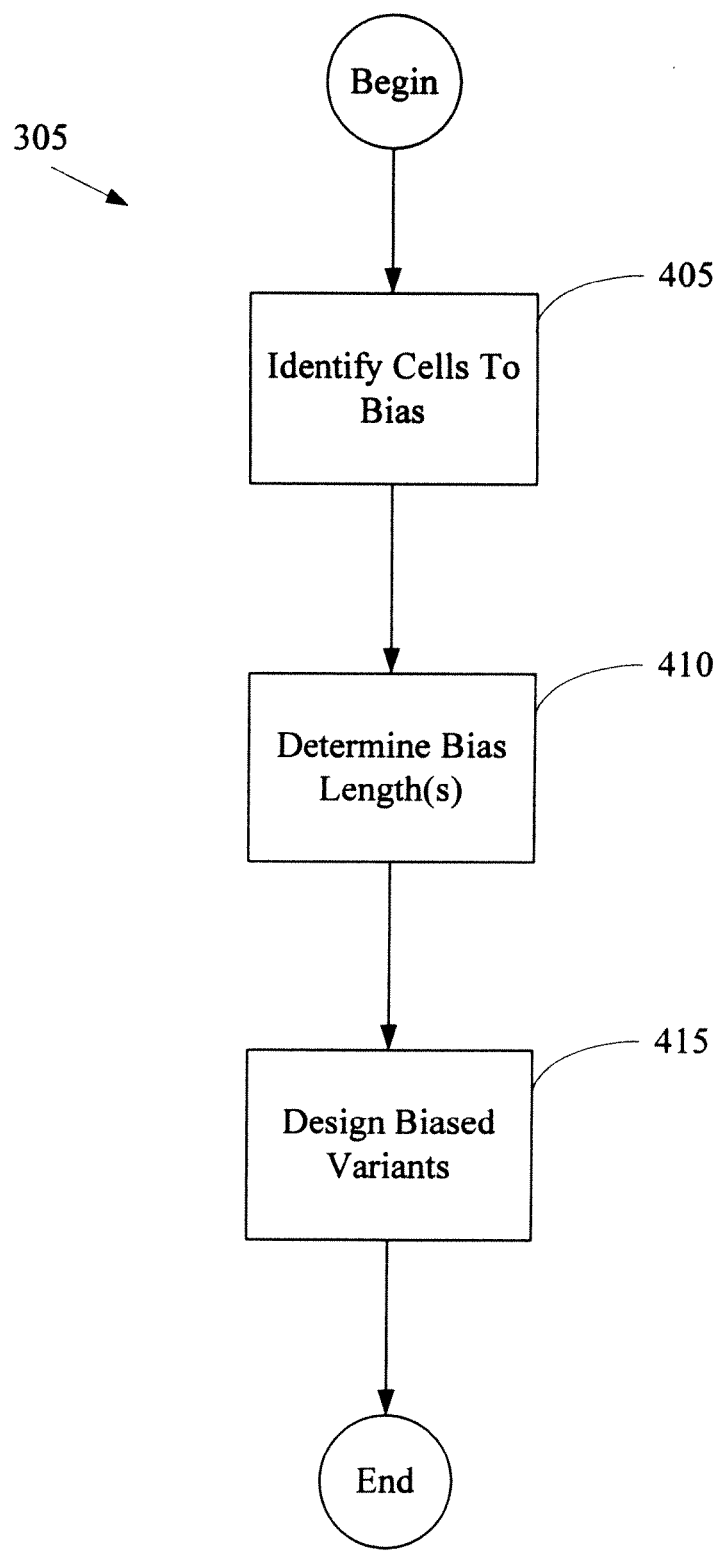
FIG. 4A is a flow chart of an exemplary CLLB embodiment of the library generation step of the method of FIG. 3.

As discussed above, gate-length biasing may be implemented at the cell level. FIG. 4A is a flow chart of an exemplary cell-level Lgate biasing (CLLB) embodiment of the library generation 305 step of method 300. A library may include hundreds of cells designed for a particular technology node. To enhance the library, in accordance with the CLLB approach, cells are identified 405 for biasing. For example, all cells in the library may be targeted for biasing, or some subset of cells, such as the most commonly used cells, may be identified.

As shown in FIG. 4A, library generation 305 also includes determining 410 a bias length for the targeted cells. In one embodiment, a single bias length is chosen. However, in alternative embodiments, multiple bias lengths may be chosen. The tradeoff is in the final size of the library generated by adding biased cell variants. The CLLB approach generally relies on the $V_{th}$ roll-off curve for a given technology. The roll-off curve affects the feasibility of the approach and also affects the chosen bias length, i.e., how much to increase the nominal gate-length.

One embodiment of the CLLB library generation 305 focuses on less than 10% biasing. However, alternative embodiments may include biasing over 10%. Bias lengths less than 10% of the nominal gate-length are advantageous for several reasons. First, the nominal gate-length of the technology is usually very close to or beyond the "knee" of the leakage vs. $L_{Gate}$ curve which arises due to SCE. For large bias (i.e., significant increases in $L_{Gate}$), the advantage of super-linear dependence of leakage on gate-length is lost. Moreover, dynamic power and delay both increase almost linearly with gate-length. Therefore, small biases give more "bang for the buck." Second, from a manufacturability point of view, having two prevalent pitches, which are relatively distinct, in the design can harm printability properties (i.e., the size of the process window). Cells with biases of less than about 10% can often retain the same poly-pitch as the unbiased version of the cell. There is a small decrease in spacing between gate-poly geometries, but minimum spacing rules typically are not violated even when the unbiased polys are at minimum spacing, since the biases are within the tolerance margins. Since design rule check (DRC) tools first snap to grid, biases of under about 10% typically are considered acceptable due to margins in design rules. Third, an increase in drawn dimension that is less than the layout grid resolution (e.g., typically 10 nm for 130 nm technology) ensures pin-compatibility with the nominal version of the cell. This is important to ensure that multi-$L_{Gate}$ optimizations can be done post-placement or even after detailed-routing, without ECOs. In this way, the layout transparency that has made multi-$V_{th}$ optimization so adoptable within chip implementation flows is retained. Biases smaller than the layout grid-pitch typically will also ensure design-rule correctness for the biased cell layout, provided that the unbiased version is design-rule correct.

As shown in FIG. 4A, library generation 305 also entails designing 415 the biased variants. In particular, the biased $L_{Gate}$ library is laid out and characterized. Since small biases to the gate-length are usually selected 410, the layout of the biased library cell usually does not need to change except for a simple automatic scaling of dimensions. Moreover, if the bias is smaller than the minimum layout grid pitch, design rule violations typically do not occur. After the slight modifications to the layout, the biased versions of the cell are put through the standard extraction and power/timing characterization process.

As an example, seven test cases were chosen to provide verification of the CLLB approach. For library generation 305, the test cases were first synthesized with the complete Artisan TSMC 130 nm library to identify 405 the most frequently used cells. A restricted library was generated composed of variants of the 25 most commonly used cells in the test cases. A biased variant, in which all devices had the biased gate-length, was added for each cell.

The SPICE models for unbiased cells had a nominal gate-length of 130 nm for all transistors. All transistors in a biased variant of a cell had a gate-length of 138 nm. Choosing 410 138 nm as the biased gate-length places the delay of the low-$V_{th}$-biased variant between the low-$V_{th}$-nominal gate-length variant and the nominal-$V_{th}$-nominal gate-length variant. Larger bias can lead to larger per-cell leakage savings at a higher performance cost. However, in a resizing setup (described below) with a delay constraint, the leakage benefit over the whole design can decrease as the number of instances that can be replaced by their biased version is reduced. Larger or smaller biases may produce larger leakage reductions for some designs. Libraries, however, are usually not design specific and a biased gate-length that produces good leakage reductions for most designs is desirable. The approach for determining 410 the biased gate-length described above will generally work well for most typical designs. Those of skill in the art will appreciate that the value of 138 nm is highly process specific and is not intended to reflect the best biased gate-length for all 130 nm processes. Alternative embodiments may use biasing at finer levels of granularity, for example, having multiple biased gate-lengths and/or independently biasing devices within a cell.

Figure 4B:
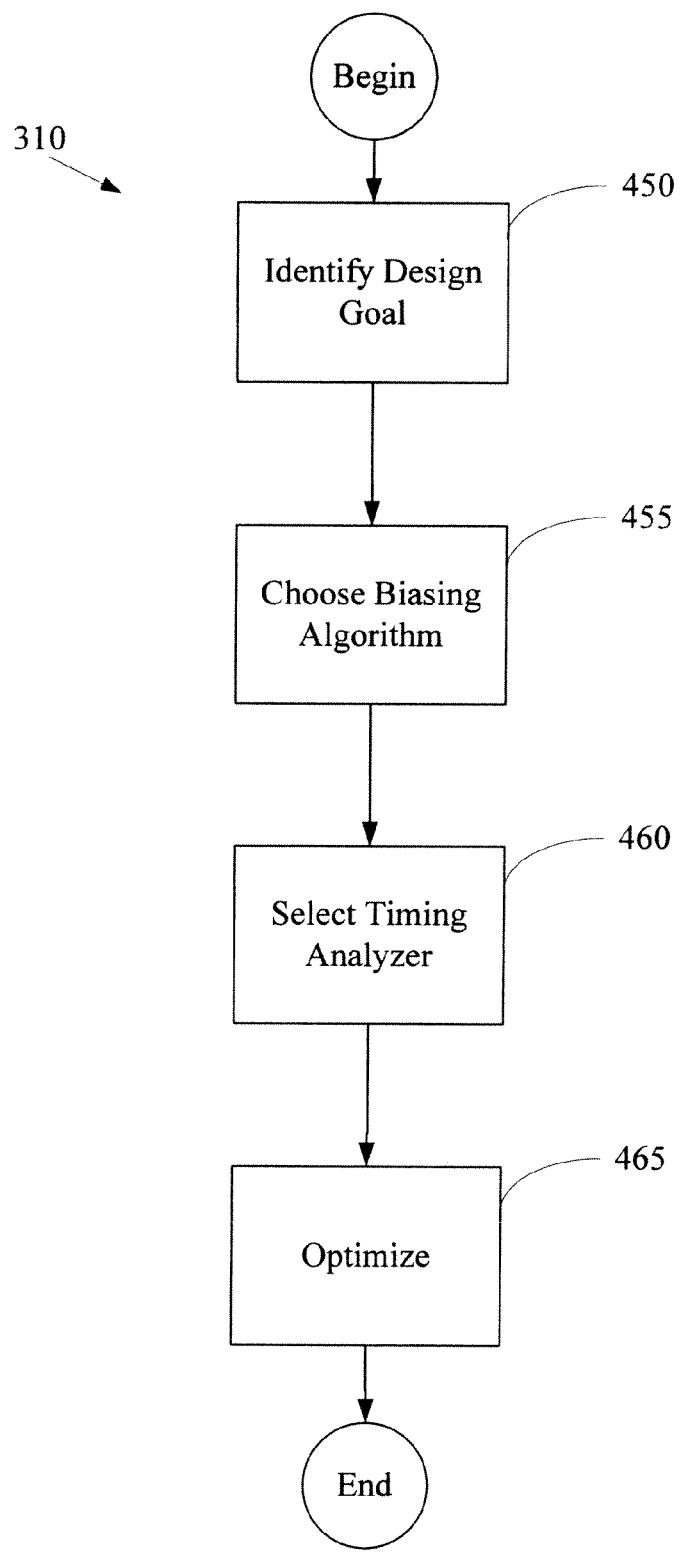
FIG. 4B is a flow chart of an exemplary CLLB embodiment of the design optimization step of the CLLB method of FIG. 3.

As discussed above, in an exemplary embodiment of method 300, design optimization 310 entails leakage reduction. FIG. 4B is a flow chart of an exemplary CLLB embodiment of the design optimization 310 step of method 300. An exemplary embodiment of design optimization 310 includes identifying 450 a design goal. In one embodiment, the design goal may be minimizing delay, which is often a primary design goal in circuit design. Alternative embodiments, however, may be designed to achieve other design goals, such as other types of power reduction, improved manufacturability or reliability or yield, or reducing timing delays or increasing the operating frequency of a chip. In the case of delay as a design goal, a circuit designer performs gate-width sizing to achieve the minimum possible delay. Such sizing may be performed, for example, prior to gate-length biasing.

In the example of FIG. 4B, design optimization 310 also includes choosing 455 a biasing algorithm. Different algorithms will be apparent. For large optimizations, an iterative approach may be desirable. For small cases, exhaustive search may be appropriate. In one embodiment, the biasing algorithm may be a downsizing algorithm for leakage reduction. In an alternative embodiment, an upsizing algorithm for leakage reduction may be used. In further alternative embodiments, a combination of downsizing and upsizing, or other algorithms may be used. A sensitivity-based, downsizing algorithm for leakage optimization begins with all nominal cells and replaces cells on non-critical paths with biased variants. An upsizing algorithm begins with all biased variants in the circuit and replaces critical cells with their nominal-$L_{Gate}$ variants. In many cases, downsizing appears to be more effective at leakage reduction than upsizing irrespective of the delay constraints. An intuitive rationale is that upsizing approaches have dual objectives of delay and leakage reduction during cell selection for upsizing. Downsizing approaches, on the other hand, only downsize cells that do not cause timing violations and have the sole objective of leakage minimization. An upsizing approach, however, may be faster when loose delay constraints are to be met since fewer transistors are upsized. Delay is almost always the primary design goal, however, and loose delay constraints are rare.

The phrase "downsizing a cell instance" (or node) implies replacing the cell or node by its biased variant in the circuit. In an exemplary embodiment of a sensitivity-based downsizing algorithm, $s_p$ represents the timing slack on a given cell instance p, and $s'_p$ represents the slack on p after it has been downsized. $l_p$ and $l'_p$ indicate the initial and final leakages of cell instance p before and after downsizing respectively. $P_p$ represents the sensitivity associated with cell instance p and is defined as:

$$P_p = \frac{l_p - l'_p}{s_p - s'_p}$$

As shown in FIG. 4B, design optimization 310 also includes selecting 460 a timing analyzer. A timing analyzer is a useful component of a delay-aware power optimization approach. It is used to compute delay sensitivity to biasing of cell instances in the design. For an accurate yet scalable implementation, various embodiments of the design optimization 310 may choose from, for example, three types of timers that vary in speed and accuracy: standard static timing analysis (SSTA), exact incremental STA (EISTA), or constrained incremental STA (CISTA).

Under SSTA, slews and actual arrival times (AATs) are propagated forward after a topological ordering of the circuit. Required arrival times (RATs) are back-propagated and slacks are then computed. Under EISTA, timing analysis begins with the fan-in nodes of the node that has been modified. From all these nodes, slews and AATs are propagated in the forward direction until the values stop changing. RATs are back-propagated from only those nodes for which the slew, AAT or RAT has changed. Under CISTA, sensitivity computation involves temporary modifications to a cell to find change in its slack and leakage. To make this step faster, the incremental timing calculation can be restricted to only one stage before and one stage after the modified gate. The next stage is affected by slew changes and the previous stage is affected by the pin capacitance change of the modified gate. The ripple effect on other stages farther away from the gate, primarily due to slew changes but potentially also due to coupling induced delay as the arrival time windows can change, may be neglected since high accuracy is not critical for sensitivity computation.

As shown in FIG. 4B, design optimization 310 also includes optimizing 465. In an exemplary embodiment of a CLLB approach, design optimization 310 entails leakage reduction. Thus, an exemplary embodiment of optimizing 465 includes performance of leakage optimization.

FIG. 5 is sample pseudocode for an exemplary embodiment of a leakage optimization implementation. The algorithm begins with SSTA and initializes slack values $s_p$ in Line 1. Sensitivities $P_p$, are computed for all cell instances p and put into a set S in Lines 2-5. The largest sensitivity $P_{p*}$ is selected and removed from the set S, and the algorithm continues if $P_{p*} \geq 0$. In Line 11, the function SaveState saves the gate-lengths of all transistors in the circuit as well as the delay, slew, and slack values. The cell instance p* is downsized and EISTA is run from it to update the delay, slew, and slack values in Lines 12-13. The timing libraries capture the effect of biasing on slew as well as input capacitance, and the static timing analyzer efficiently and accurately updates the design to reflect the changes in delay, capacitance, and slew due to the downsizing move. If there is no timing violation (e.g., negative slack on any timing arc) then the move is accepted, otherwise the saved state is restored. If the move is accepted, sensitivities of node p*, its fan-in nodes, and its fan-out nodes are updated in Lines 17-21. The algorithm continues until the largest sensitivity becomes negative or the size of S becomes zero. Function ComputeSensitivity(q) temporarily downsizes cell instance q and finds its slack using CISTA. Since high accuracy is not critical for sensitivity computation CISTA, which is faster but less accurate than EISTA, may be used for timing analysis.

As an example of the CLLB design optimization 310, minimum delay was identified 450 as the design goal. Gate-width sizing was performed prior to $L_{Gate}$ biasing using Synopsys Design Compiler v2003.06-SP1. A sensitivity-based downsizing algorithm was chosen 455 as the biasing algorithm. In terms of selecting 460 a timing analyzer, under SSTA, slew and slack values of the timer matched exactly with Synopsys PrimeTime vU-2003.03-SP2. Delay values from the timer also matched exactly with PrimeTime under the restricted use model. However, the timer did not support features such as interconnect delay, hold time checks, false paths, multiple clocks, 3-pin SDFs, etc. Additionally, the timer could handle both unate and non-unate cells. Under EISTA, slews, slacks, and delays matched exactly with SSTA. Under CISTA, incremental timing calculation was restricted to one stage before and one stage after the modified gate and the ripple effect was neglected. Each test case was optimized 465 for leakage reduction. Table 1 is a comparison of leakage and runtime (labeled as CPU) when EISTA, which is generally more accurate, and CISTA, which is generally faster, were used for sensitivity computation. Table 1 show the results from CISTA were almost the same as from EISTA, with a significant savings in central processing unit (CPU) runtime.

TABLE 1

| | Leakage (mW) | | CPU (s) | |
|---|---|---|---|---|
| Circuit | EISTA | CISTA | EISTA | CISTA |
| s9234 | 0.0712 | 0.0712 | 4.86 | 2.75 |
| c5315 | 0.3317 | 0.3359 | 24.18 | 14.99 |
| c7552 | 0.6284 | 0.6356 | 55.56 | 43.79 |
| s13207 | 0.1230 | 0.1228 | 33.43 | 17.15 |
| c6288 | 1.8730 | 1.9157 | 508.86 | 305.09 |
| alu128 | 0.4687 | 0.4857 | 1122.89 | 544.75 |
| s38417 | 0.4584 | 0.4467 | 1331.49 | 746.79 |

Transistor-Level Gate-Length Biasing

The term "timing arc" indicates an intra-cell path from an input transition to a resulting rise (or fall) output transition. Generally, for an n-input gate there are 2n timing arcs; however, there may be four timing arcs corresponding to non-unate inputs (e.g., select input of MUX). Due to different parasitics as well as PMOS/NMOS asymmetries, these timing arcs can have different delay values associated with them. For instance, Table 2 shows the delay values for the same input slew and load capacitance pair for different timing arcs of a NAND2X2 cell from the Artisan TSMC 130 nm library. The asymmetry in delays of various timing arcs within the NAND2X2 cell is clear. Pin swapping is a common post-synthesis timing optimization step to make use of the asymmetry in delays of different input pins. To make use of asymmetry in rise-fall delays, techniques such as P/N ratio perturbations, for example, may decrease circuit delay.

TABLE 2

| Timing Arc | Propagation Delay (ps) | Transition Delay (ps) |
|---|---|---|
| A → Y ↑ | 99.05 | 104.31 |
| A → Y ↓ | 73.07 | 79.12 |
| B → Y ↑ | 107.20 | 112.98 |
| B → Y ↓ | 70.65 | 76.37 |

The gate-length biasing methodology can also exploit the asymmetries in delay values using transistor-level gate-length biasing (TLLB). Since different transistors control different timing arcs of a cell, TLLB can individually modify delays of different timing arcs. For example, TLLB can yield leakage optimization by "recovering" leakage from cell instances in which: (1) not all timing arcs are timing-critical, and/or (2) rise and fall transitions are not both timing-critical at the same time.

As with CLLB described above, TLLB uses libraries of cells, which are used by system-level chip designers to design particular chips. Each cell includes one or more transistors configured to perform some function, such as a NAND cell, an inverter, a buffer, or other circuit. The current-voltage characteristics of the transistors in a cell are determined by the device's properties, which are generally optimized for a particular technology node; for example, a 130 nm gate-length technology node. Further perturbations, however, made to some of these properties, for example, gate-length biasing, can be used to further optimize performance for particular designs.

Figure 6:
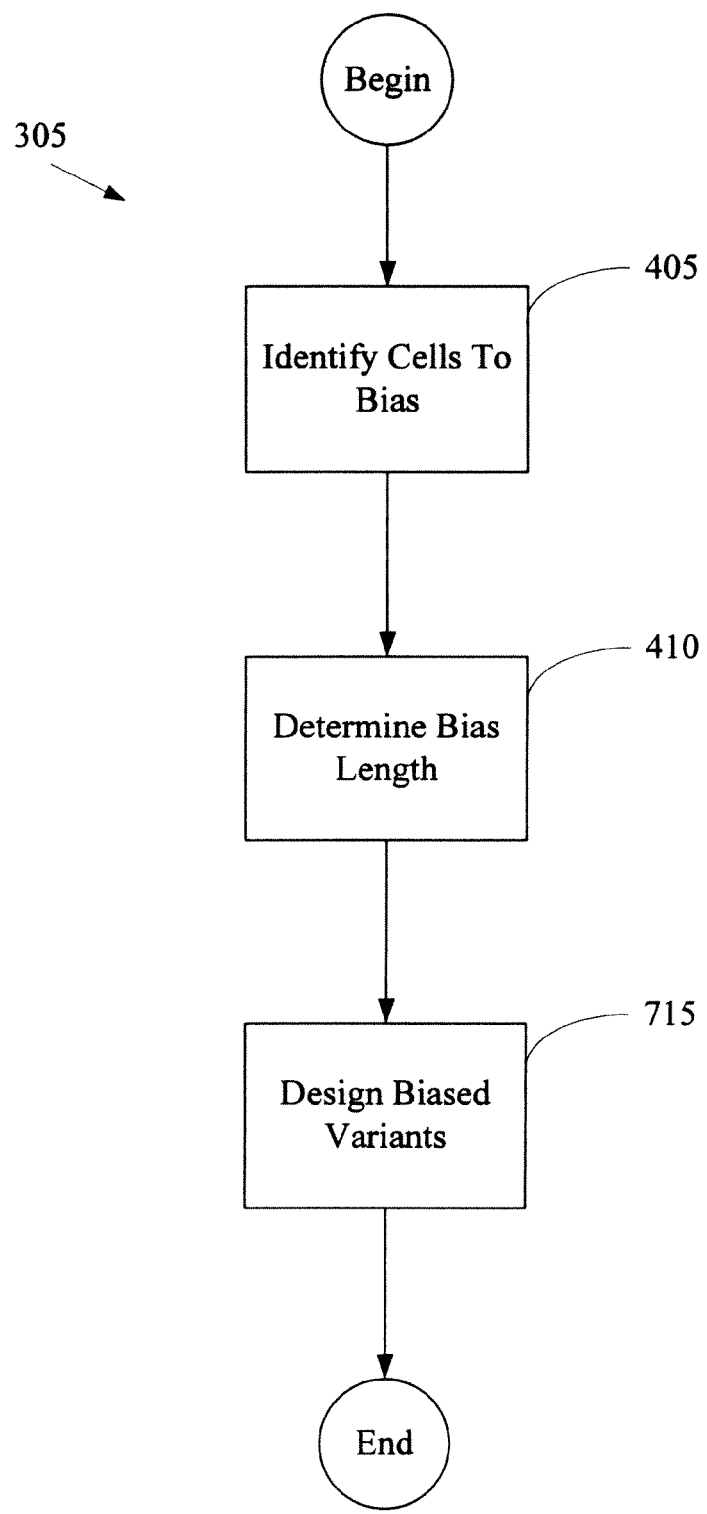
FIG. 6 is a flow chart of an exemplary TLLB embodiment of the library generation step of the method of FIG. 3.

FIG. 6 is a flow chart of an exemplary TLLB embodiment of the library generation 305 step of the method 300 of FIG. 3. Similarly to FIG. 4A, cells are identified 405 for biasing and bias lengths are determined 410.

As shown in FIG. 6, library generation 305 also entails designing 715 the biased variants. For each cell, the library may contain variants corresponding to all subsets of the set of timing arcs. A gate with n inputs has 2n timing arcs and therefore $2^{2n}$ variants, including the original cell. Given a set of critical timing arcs, the goal is to assign a biased $L_{Gate}$ to some transistors in the cell and nominal $L_{Gate}$ to the remaining transistors.

Figure 7:
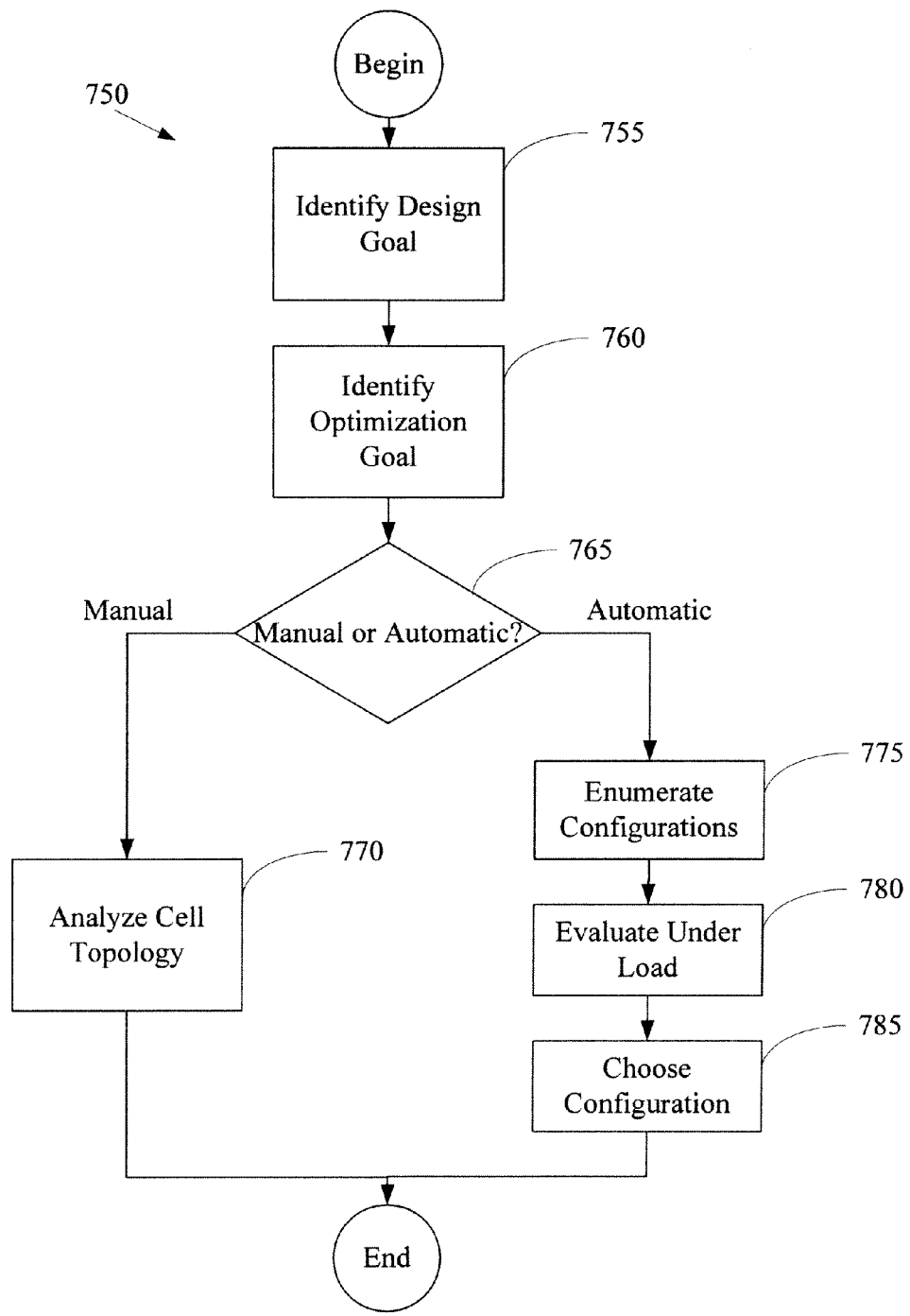
FIG. 7 is a flow chart of an exemplary embodiment of a biasing method to design biased variants for the library generation method of FIG. 6.

FIG. 7 is a flow chart of an exemplary embodiment of a biasing method 750 to design 715 biased variants. Under biasing method 750, a design goal is identified 755, for example, minimum delay. An optimization goal is also identified 760, for example, leakage reduction. Given the design goal and the optimization goal, the task is to design biased variants such that, for example, (1) critical timing arcs have a delay penalty of less than 1% with respect to the original unbiased cell, and (2) cell leakage power is minimized. In one embodiment, assignment of a biased $L_{Gate}$ to transistors in a cell, given a set of critical timing arcs, can be done manually 765 by analyzing 770 the cell topology for simple cells. In an alternative embodiment, however, the process can also be automated 765. In an exemplary automatic process, all configurations for each cell in which nominal $L_{Gate}$ is assigned to some transistors and biased $L_{Gate}$ to the others are enumerated 775. For each configuration, the delay and leakage are determined 780 under a canonical output load, for example, using SPICE simulations with an inverter (INVX1) as a load. For each possible subset of timing arcs that can be simultaneously critical, one biasing configuration is chosen 785 based on the two criteria given earlier.

Figure 8:
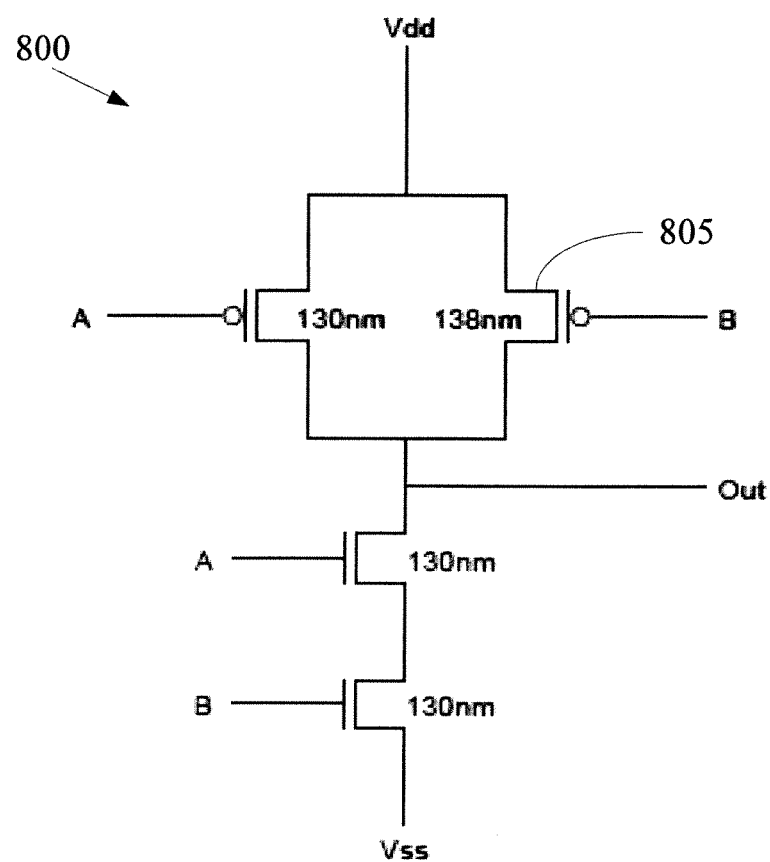
FIG. 8 is a schematic diagram of a simple NAND cell biased using the TLLB method.

As an example, FIG. 8 is a schematic diagram of a simple NAND cell 800 biased using the TLLB method. The biasing scheme shown in FIG. 8 shows $L_{Gate}$ biasing of the transistors in the simplest NAND cell (NAND2X1) when only the rise and fall timing arcs from input A to the output Out are critical. In this case only the PMOS device 805 with B as its input can be slowed without penalizing the critical timing arcs.

Referring to FIG. 3, the TLLB method also entails design optimization 310. As discussed above, in an exemplary embodiment of the TLLB method, design optimization 310 entails leakage reduction, in which leakage optimization is performed. The exemplary embodiment of the design optimization 310 method of FIG. 4B, discussed above with respect to the CLLB method, may also be applied for the TLLB method. For example, a sensitivity-based downsizing approach that is similar to the one described above with reference to FIGS. 4B and 5 and the CLLB method can be used to optimize for leakage reduction. The method keeps track of the slack on every timing arc and computes sensitivity for each timing arc.

A particular benefit of the TLLB method is that it can be performed in conjunction with other optimization techniques, including the CLLB method discussed above. For example, in one embodiment, to limit the runtime and memory requirements, optimization may occur first at the cell level, using the CLLB method 300, and then at the transistor level, using the TLLB method 600. Further savings can be achieved, for example, by optimizing only the unbiased cells in the circuit. In another embodiment, the TLLB method may be implemented to further optimize a process flow that already includes a multi-$V_{th}$ approach or even a multi-gate-length approach to provide optimization with a device-level granularity to optimize based on critical timing arcs.

Experimental Examples

A test flow for validation of the $L_{Gate}$ biasing methodology was implemented in the context of leakage reduction. Seven test cases were chosen for investigation. Details of the test cases used in the experiments are given in Table 3. For each test case, Table 3 shows the source of the test case, the number of cells in the circuit, delay, leakage power, and dynamic power. Sequential test cases (e.g., those beginning with "s") were handled by converting them to combinational circuits by treating all flip-flops as primary inputs and primary outputs. The test flow was designed to validate an $L_{Gate}$ biasing methodology in which CLLB was performed first followed by TLLB to show further reductions in leakage. Thus, while library generation and design optimization are discussed primarily with respect to the CLLB method, the discussion applies as well to the TLLB method.

TABLE 3

| Test Case | Source | #Cells | Delay (ns) | Leakage (mW) | Dynamic (mW) |
|---|---|---|---|---|---|
| s9234 | ISCAS'89 | 861 | 0.437 | 0.7074 | 0.3907 |
| c5315 | ISCAS'85 | 1442 | 0.556 | 1.4413 | 1.5345 |
| c7552 | ISCAS'85 | 1902 | 0.485 | 1.8328 | 2.0813 |
| s13207 | ISCAS'89 | 1957 | 0.904 | 1.3934 | 0.6296 |
| c6288 | ISCAS'85 | 4289 | 2.118 | 3.5994 | 8.0316 |
| alu128 | Opencores.org[2] | 7536 | 2.306 | 5.1571 | 4.4177 |
| s38417 | ISCAS'89 | 7826 | 0.692 | 4.9381 | 4.2069 |

In this example, to identify the cells to bias, the test cases were synthesized with the Artisan TSMC 130 nm library using Synopsys Design Compiler v2003.06-SP1 with low-$V_{th}$ cells only. To limit library characterization runtime, the library was restricted to variants of the following 25 most frequently used cells: CLKINVX1, INVX12, INVX1, INVX3, INVX4, INVX8, INVXL, MXI2X1, MXI2X4, NAND2BX4, NAND2X1, NAND2X2, NAND2X4, NAND2X6, NAND2X8, NAND2XL, NOR2X1, NOR2X2, NOR2X4, NOR2X6, NOR2X8, OAI21X4, XNOR2X1, XNOR2X4, XOR2X4. To identify the most frequently used cells, the test cases were synthesized with the complete library and the 25 most frequently used cells were selected. The delay constraint was kept tight so that the post-synthesis delay was close to the minimum achievable delay. The enhanced library was generated and the circuit designs optimized as described previously.

This example focused on up to two gate-lengths (nominal and biased) and two threshold voltages. Experiments were performed for the following scenarios: (1) Single-$V_{th}$, single-$L_{Gate}$ (SVT-SGL), (2) Dual-$V_{th}$, single-$L_{Gate}$ (DVT-SGL), (3) Single-$V_{1h}$, dual-$L_{Gate}$ (SVT-DGL), and (4) Dual-$V_{th}$, dual-$L_{Gate}$ (DVT-DGL). The dual-$V_{th}$ flow used nominal and low values of $V_{th}$ while the single-$V_{th}$ flow used only the low value of $V_{th}$. STMicroelectronics 130 nm device models were used with two $V_{th}$ values each for PMOS transistors (−0.09V and −0.17V) and NMOS transistors (0.11V and 0.19V). Cadence SignalStorm v4.1 (with Synopsys HSPICE) was used for delay and power characterization of cell variants. Synopsys Design Compiler was used to measure circuit delay, dynamic power, and leakage power. An activity factor of 0.02 was assumed for dynamic power calculation in the experiments. No assumptions were made for any wire-load models; as a result, the dynamic power and delay overheads of $L_{Gate}$ biasing are conservative (i.e., overestimated). All experiments were run on an Intel Xeon 1.4 GHz computer with 2 GB of RAM.

Table 4 shows the leakage savings and delay penalties due to $L_{Gate}$ biasing for all cells in the library, for both low $V_{th}$ and nominal $V_{th}$. In this experiment, small gate-length biasing reduced leakage by 24% to 38% for the most commonly used cells, while incurring delay penalties generally fewer than 10%. The results show that small biases in $L_{Gate}$ can afford significant leakage savings with small performance impact.

TABLE 4

| | Low $V_{th}$ | | Nominal $V_{th}$ | |
|---|---|---|---|---|
| Cell | Leakage Reduction (%) | Delay Penalty (%) | Leakage Reduction (%) | Delay Penalty (%) |
| CLKINVX1 | 30.02 | 5.59 | 34.12 | 5.54 |
| INVX12 | 30.28 | 4.70 | 36.27 | 6.87 |
| INVX1 | 29.45 | 5.08 | 33.63 | 5.12 |
| INVX3 | 30.72 | 5.68 | 35.67 | 5.52 |
| INVX4 | 30.01 | 5.36 | 35.38 | 6.28 |

TABLE 4-continued

| | Low $V_{th}$ | | Nominal $V_{th}$ | |
|---|---|---|---|---|
| Cell | Leakage Reduction (%) | Delay Penalty (%) | Leakage Reduction (%) | Delay Penalty (%) |
| INVX8 | 29.97 | 6.75 | 35.73 | 5.25 |
| INVXL | 24.16 | 4.91 | 28.05 | 4.79 |
| MXI2X1 | 23.61 | 5.45 | 27.26 | 5.97 |
| MXI2X4 | 27.77 | 6.28 | 33.27 | 6.76 |
| NAND2BX4 | 29.86 | 7.70 | 34.07 | 7.52 |
| NAND2X1 | 33.19 | 5.32 | 37.03 | 5.58 |
| NAND2X2 | 32.55 | 6.13 | 36.64 | 6.47 |
| NAND2X4 | 32.21 | 6.54 | 36.95 | 6.63 |
| NAND2X6 | 31.76 | 11.37 | 37.09 | 6.75 |
| NAND2X8 | 31.70 | 6.07 | 37.14 | 7.29 |
| NAND2XL | 28.81 | 5.39 | 29.86 | 5.50 |
| NOR2X1 | 27.42 | 5.47 | 32.58 | 5.39 |
| NOR2X2 | 28.54 | 5.92 | 34.06 | 5.66 |
| NOR2X4 | 28.85 | 6.61 | 34.25 | 8.21 |
| NOR2X6 | 28.78 | 7.29 | 34.18 | 7.47 |
| NOR2X8 | 28.76 | 6.51 | 34.40 | 6.96 |
| OAI21X4 | 32.89 | 6.98 | 37.63 | 6.82 |
| XNOR2X1 | 28.22 | 5.75 | 33.06 | 7.59 |
| XNOR2X4 | 30.96 | 4.86 | 37.99 | 7.76 |
| XOR2X4 | 30.87 | 7.92 | 37.98 | 6.85 |

To assess the maximum impact of biasing, the power-performance envelope obtained by replacing every device in the design by its device-level biased variant was explored. The leakage optimization approach was then applied to selectively bias cells on non-critical paths. Table 5 shows the impact of gate-length biasing on power for single threshold-voltage designs. In particular, Table 5 shows leakage reduction, dynamic power penalty, and total power reduction for the test cases when $L_{Gate}$ biasing was applied without dual-$V_{th}$ assignment. The delay penalty constraint was set to 0%, 2.5%, and 5% for each of the test cases. Note that the delay penalty for SVT-SGL was always set to 0% due to the non-availability of $V_{th}$ and $L_{Gate}$ knobs. SVT-DGL was slower than SVT-SGL for delay penalties of 2.5% and 5%.

TABLE 5

| | | SVT-SGL | | | SVT-DGL | | | Reduction | | | |
|---|---|---|---|---|---|---|---|---|---|---|---|
| Test | Delay (ns) | Leakage (mW) | Dynamic (mW) | Total (mW) | Leakage (mW) | Dynamic (mW) | Total (mW) | Leakage (%) | Dynamic (%) | Total (%) | CPU (s) |
| s9234 | 0.437 | 0.7074 | 0.3907 | 1.0981 | 0.5023 | 0.4005 | 0.9028 | 28.99 | −2.50 | 17.79 | 1.81 |
| | 0.447 | 0.7074 | 0.3907 | 1.0981 | 0.5003 | 0.4006 | 0.9008 | 29.28 | −2.52 | 17.96 | 1.79 |
| | 0.458 | 0.7074 | 0.3907 | 1.0981 | 0.4983 | 0.4006 | 0.8988 | 29.56 | −2.51 | 18.15 | 1.79 |
| c5315 | 0.556 | 1.4413 | 1.5345 | 2.9758 | 1.2552 | 1.5455 | 2.8007 | 12.91 | −0.72 | 5.88 | 5.60 |
| | 0.570 | 1.4413 | 1.5345 | 2.9758 | 1.0415 | 1.5585 | 2.6000 | 27.74 | −1.56 | 12.63 | 5.80 |
| | 0.584 | 1.4413 | 1.5345 | 2.9758 | 1.0242 | 1.5604 | 2.5846 | 28.94 | −1.69 | 13.15 | 5.79 |
| c7552 | 0.485 | 1.8328 | 2.0813 | 3.9141 | 1.4447 | 2.0992 | 3.5439 | 21.18 | −0.86 | 9.46 | 10.97 |
| | 0.497 | 1.8328 | 2.0813 | 3.9141 | 1.3665 | 2.1042 | 3.4707 | 25.44 | −1.10 | 11.33 | 11.08 |
| | 0.509 | 1.8328 | 2.0813 | 3.9141 | 1.3177 | 2.1084 | 3.4261 | 28.10 | −1.30 | 12.47 | 10.89 |
| s13207 | 0.904 | 1.3934 | 0.6296 | 2.0230 | 0.9845 | 0.6448 | 1.6293 | 29.35 | −2.42 | 19.46 | 11.46 |
| | 0.927 | 1.3934 | 0.6296 | 2.0230 | 0.9778 | 0.6449 | 1.6226 | 29.83 | −2.42 | 19.79 | 11.31 |
| | 0.949 | 1.3934 | 0.6296 | 2.0230 | 0.9758 | 0.6446 | 1.6204 | 29.97 | −2.39 | 19.90 | 11.27 |
| c6288 | 2.118 | 3.5994 | 8.0316 | 11.6310 | 3.3391 | 8.0454 | 11.3845 | 7.23 | −0.17 | 2.12 | 70.51 |
| | 2.171 | 3.5994 | 8.0316 | 11.6310 | 2.8461 | 8.0931 | 10.9392 | 20.93 | −0.77 | 5.95 | 74.79 |
| | 2.224 | 3.5994 | 8.0316 | 11.6310 | 2.7415 | 8.1051 | 10.8466 | 23.83 | −0.92 | 6.74 | 70.11 |
| alu128 | 2.306 | 5.1571 | 4.4177 | 9.5748 | 4.5051 | 4.4429 | 8.9480 | 12.64 | −0.57 | 6.55 | 270.00 |
| | 2.363 | 5.1571 | 4.4177 | 9.5748 | 3.5992 | 4.4818 | 8.0810 | 30.21 | −1.45 | 15.60 | 212.97 |
| | 2.421 | 5.1571 | 4.4177 | 9.5748 | 3.5900 | 4.4826 | 8.0726 | 30.39 | −1.47 | 15.69 | 211.47 |
| s38417 | 0.692 | 4.9381 | 4.2069 | 9.1450 | 3.4847 | 4.2765 | 7.7612 | 29.43 | −1.65 | 15.13 | 225.18 |
| | 0.710 | 4.9381 | 4.2069 | 9.1450 | 3.4744 | 4.2778 | 7.7522 | 29.64 | −1.69 | 15.23 | 225.68 |
| | 0.727 | 4.9381 | 4.2069 | 9.1450 | 3.4713 | 4.2779 | 7.7492 | 29.70 | −1.69 | 15.26 | 221.35 |

Table 6 shows the impact of gate-length biasing on power when $L_{Gate}$ biasing was applied together with the dual-$V_{th}$ approach (i.e., for double threshold-voltage designs). The delay penalty constraint was set to 0%, 2.5%, and 5% for each of the test cases. Tables 5 and 6 also show the delay and CPU runtime consumed.

pendent component includes edge direct tunneling ($I_{gs}+I_{gd}$), while the gate-length dependent component includes gate-to-channel ($I_{gc}$) and gate-to-body ($I_{gb}$) tunneling. The gate-length independent component, which stems from the gate-drain and gate-source overlap regions, is not affected by gate-length biasing.

TABLE 6

| Test | Delay (ns) | DVT-SGL | | | DVT-DGL | | | Reduction | | | CPU (s) |
| --- | --- | --- | --- | --- | --- | --- | --- | --- | --- | --- | --- |
| | | Leakage (mW) | Dynamic (mW) | Total (mW) | Leakage (mW) | Dynamic (mW) | Total (mW) | Leakage (%) | Dynamic (%) | Total (%) | |
| s9234 | 0.437 | 0.0984 | 0.3697 | 0.4681 | 0.0722 | 0.3801 | 0.4523 | 26.60 | −2.81 | 3.37 | 1.86 |
| | 0.447 | 0.0914 | 0.3691 | 0.4604 | 0.0650 | 0.3798 | 0.4448 | 28.81 | −2.90 | 3.39 | 1.89 |
| | 0.458 | 0.0873 | 0.3676 | 0.4549 | 0.0609 | 0.3784 | 0.4393 | 30.20 | −2.95 | 3.41 | 1.83 |
| c5315 | 0.556 | 0.3772 | 1.4298 | 1.8070 | 0.3391 | 1.4483 | 1.7874 | 10.11 | −1.29 | 1.09 | 5.74 |
| | 0.570 | 0.2871 | 1.4193 | 1.7064 | 0.2485 | 1.4390 | 1.6875 | 13.45 | −1.39 | 1.11 | 6.21 |
| | 0.584 | 0.2401 | 1.4119 | 1.6520 | 0.1986 | 1.4328 | 1.6314 | 17.27 | −1.48 | 1.24 | 6.14 |
| c7552 | 0.485 | 0.6798 | 1.9332 | 2.6130 | 0.6655 | 1.9393 | 2.6048 | 2.10 | −0.32 | 0.31 | 10.40 |
| | 0.497 | 0.4698 | 1.9114 | 2.3812 | 0.4478 | 1.9210 | 2.3689 | 4.68 | −0.50 | 0.52 | 10.51 |
| | 0.509 | 0.3447 | 1.8994 | 2.2441 | 0.3184 | 1.9107 | 2.2291 | 7.63 | −0.59 | 0.67 | 10.55 |
| s13207 | 0.904 | 0.1735 | 0.5930 | 0.7664 | 0.1247 | 0.6069 | 0.7316 | 28.09 | −2.35 | 4.54 | 11.59 |
| | 0.927 | 0.1561 | 0.5920 | 0.7481 | 0.1066 | 0.6060 | 0.7127 | 31.68 | −2.37 | 4.73 | 11.73 |
| | 0.949 | 0.1536 | 0.5919 | 0.7455 | 0.1027 | 0.6060 | 0.7087 | 33.14 | −2.39 | 4.93 | 11.76 |
| c6288 | 2.118 | 1.9733 | 7.7472 | 9.7205 | 1.9517 | 7.7572 | 9.7089 | 1.09 | −0.13 | 0.12 | 79.25 |
| | 2.171 | 1.2258 | 7.5399 | 8.7657 | 1.1880 | 7.5574 | 8.7454 | 3.08 | −0.23 | 0.23 | 79.25 |
| | 2.224 | 0.8446 | 7.4160 | 8.2606 | 0.8204 | 7.4283 | 8.2487 | 2.87 | −0.17 | 0.14 | 77.28 |
| alu128 | 2.306 | 0.6457 | 3.9890 | 4.6347 | 0.5184 | 4.0353 | 4.5537 | 19.73 | −1.16 | 1.75 | 240.09 |
| | 2.363 | 0.6151 | 3.9837 | 4.5988 | 0.4970 | 4.0242 | 4.5212 | 19.21 | −1.02 | 1.69 | 262.37 |
| | 2.421 | 0.5965 | 3.9817 | 4.5782 | 0.4497 | 4.0378 | 4.4875 | 24.62 | −1.41 | 1.98 | 277.99 |
| s38417 | 0.692 | 0.5862 | 3.8324 | 4.4186 | 0.4838 | 3.8680 | 4.3518 | 17.46 | −0.93 | 1.51 | 238.62 |
| | 0.710 | 0.5637 | 3.8309 | 4.3946 | 0.4189 | 3.8861 | 4.3050 | 25.69 | −1.44 | 2.04 | 238.99 |
| | 0.727 | 0.5504 | 3.8306 | 4.3810 | 0.4067 | 3.8849 | 4.2916 | 26.11 | −1.42 | 2.04 | 234.94 |

As shown in Tables 5 and 6, in some examples (e.g., s9234, s13207, s38417), selective gate-length biasing at the circuit level reduced circuit leakage by up to 30% with no delay penalty (i.e., delay penalty constraint set to 0%). The results of Tables 5 and 6 also indicate that the leakage reductions primarily depend on the slack profile of the circuit. If many of the paths have near-zero slacks, then the leakage reductions are smaller. As the delay penalty increases, more slack is introduced on paths and larger leakage reductions are seen. The results also show leakage reductions were smaller when a circuit was previously optimized using dual-$V_{th}$ assignment. This is expected because dual-$V_{th}$ assignment consumes slack on non-critical paths reducing the slack available for $L_{Gate}$ optimization. Larger leakage reductions were also observed in sequential circuits. This is most likely because circuit delay is determined primarily by the slowest pipeline stage and the percentage of non-critical paths is typically higher in sequential circuits. In particular, the two circuits for which less leakage reductions were seen (c6288, c7552) have very few non-critical paths and a very small percentage of cells could be biased. For these test cases, even $V_{th}$ assignment does not achieve as much as it does on other test cases. For these test cases, leakage savings due to gate-length biasing are less for DVT than for SVT because fewer cells are left on non-critical paths after $V_{th}$ assignment. A greater fraction of cells are expected to lie on non-critical paths for larger sequential circuits, making the gate-length biasing methodology especially attractive for such circuits.

The leakage models in these experiments did not include gate leakage, which can marginally increase due to gate-length biasing. Gate leakage is composed of gate-length independent and dependent components. The gate-length inde- To assess the change in gate-length dependent components due to biasing, SPICE simulations were performed to report the gate-to-channel leakage for nominal and biased devices. Since the gate-to-body component is generally two orders of magnitude smaller than the gate-to-channel component, it was therefore excluded from the analysis. The analysis used 90 nm BSIM4 device models from a leading foundry that model all five components of gate leakage described in BSIM v4.4.0.

Table 7 shows the impact of gate-length biasing on sub-threshold leakage and gate tunneling leakage for biased and unbiased, nominal $V_{th}$, 90 nm NMOS and PMOS devices of width at 25° C. and 125° C. The reductions in subthreshold and gate leakage as well as the total leakage reduction are shown. As shown in Table 7, although the subthreshold leakage itself increases significantly with temperature, the percentage reduction in it due to gate-length biasing does not change much. The results of Table 7 indicate total leakage reductions were high even when gate leakage was considered. Based on these results, the increase in gate leakage due to gate-length biasing appears negligible for these cases. Furthermore, since gate-length biasing is a runtime leakage reduction approach, the operating temperature is likely to be higher than room temperature. At typical operating temperatures, gate leakage is not a major portion of total leakage, since it could be more than five times less than subthreshold leakage. Thus, when the operating temperature is elevated, the reduction in total leakage is approximately equal to the reduction in subthreshold leakage and total leakage reductions similar to the results presented in Tables 5 and 6 are expected.

TABLE 7

| Device | Temp (° C.) | Subthreshold Leakage (nW) | | | Gate Tunneling Leakage (nW) | | | Total Leakage (nW) | | |
|---|---|---|---|---|---|---|---|---|---|---|
| | | Unbiased | Biased | Reduction | Unbiased | Biased | Reduction | Unbiased | Biased | Reduction |
| PMOS | 25 | 6.45 | 4.21 | 34.73% | 2.01 | 2.03 | −1.00% | 8.46 | 6.24 | 26.24% |
| NMOS | 25 | 12.68 | 8.43 | 33.52% | 6.24 | 6.25 | −0.16% | 18.92 | 14.68 | 22.41% |
| PMOS | 125 | 116.80 | 79.91 | 31.58% | 2.17 | 2.20 | −1.38% | 118.97 | 82.11 | 30.98% |
| NMOS | 125 | 115.90 | 83.58 | 27.89% | 6.62 | 6.69 | −1.05% | 122.52 | 90.27 | 26.32% |

Gate leakage is predicted to increase with technology scaling. Technologies under 65 nm, however, are likely to adopt high-k gate dielectrics which could significantly reduce gate leakage. If this trend continues, in terms of scalability, subthreshold leakage will likely remain the dominant problem at high operating temperatures. Thus, the gate-length biasing method disclosed is likely to be of increasing benefit at smaller technology nodes. Even if gate leakage were to approach subthreshold leakage, which would be a suboptimal device engineering solution point, gate-length biasing results in exponential savings in subthreshold current for a linear penalty in gate leakage, which, while not optimal, may still be preferable. One remote issue is when the minimum gate-length is set at the peak of the "hump" often seen in $V_{th}$ vs. L curves due to the reverse short channel effect and caused by halo implants. If the minimum gate-length is set at the peak of the hump gate leakage may actually worsen with increasing gate-length. Typically, this is not the case, however, since such a minimum gate-length is usually not the best design point. For example, with a typical commercial 90 nm low-$V_{th}$ device, the 80 nm drawn gate-length can be biased by over 10 nm before reaching the start of the "hump."

In addition, because vertical electric fields do not increase due to gate-length biasing, another possible benefit of the gate-length biasing methodology is that negative-bias thermal instability (NBTI) is not expected to increase with gate-length biasing. Should NBTI correlate with gate-length, possibly due to weak process dependent variations in NBTI due to channel length, $L_{Gate}$ biasing of PMOS transistors may be constrained, since NBTI primarily affects PMOS devices while NMOS devices are more strongly affected by subthreshold leakage.

Manufacturability and process variability are important considerations of the $L_{Gate}$ biasing approach. As the gate-length biasing method relies primarily on biasing of drawn gate-length, it is important to correlate this with actual printed gate-length on the wafer. This is important as the bias introduced in gate-length is of the same order as the typical critical dimension (CD) tolerances in manufacturing processes. Moreover, experimental observations are consistent with expecting larger gate-lengths to have better printability properties leading to less CD—and hence leakage—variability. To validate the multiple gate-length approach in a post-manufacturing setup, a reticle enhancement technology (RET) and process simulation flow for an example cell master are followed.

Figure 9:
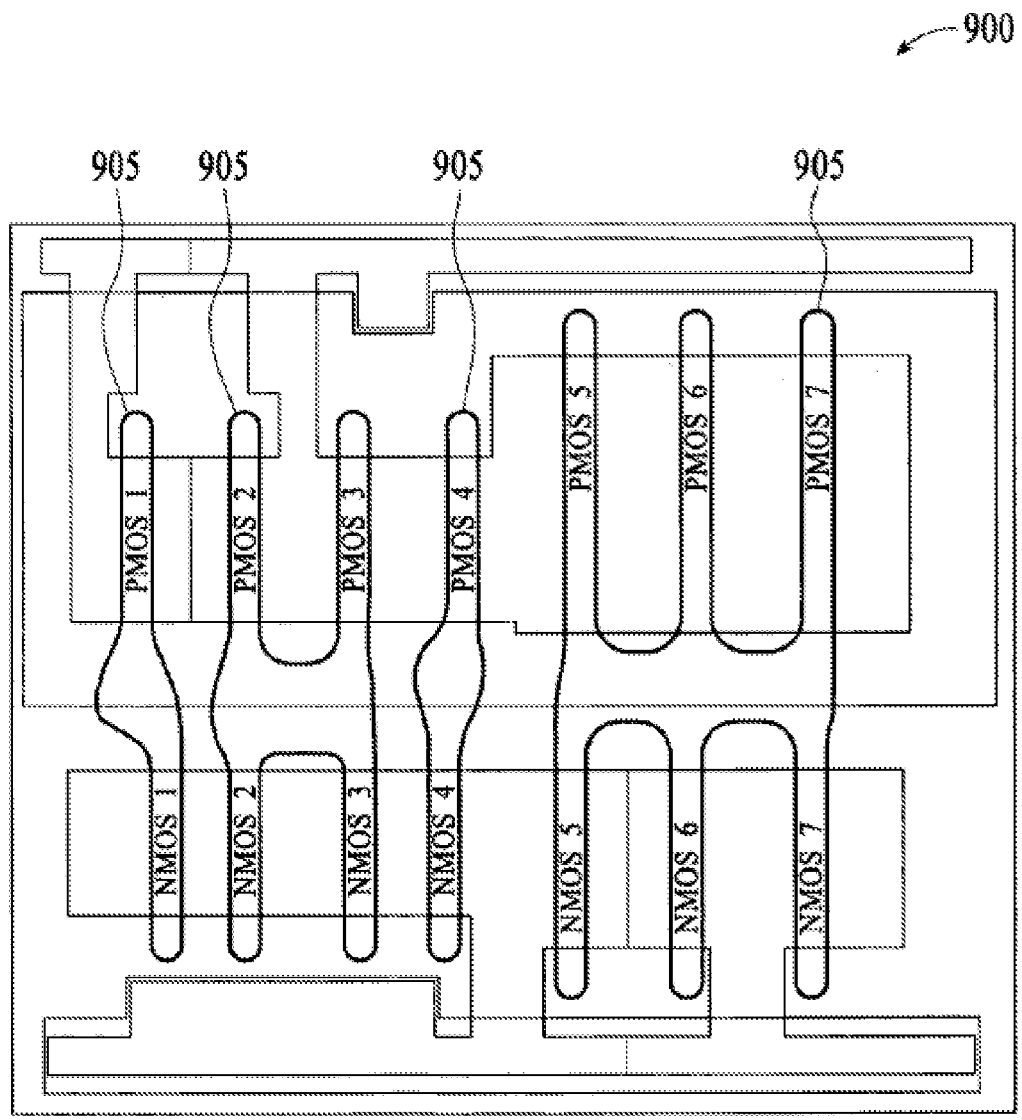
FIG. 9 is an image of a cell layout of the generic AND2X6 cell with simulated printed gate-lengths for all devices in the cell.

In this experiment, model-based optical proximity correction (OPC) is performed on the layout of a generic AND2X6 cell using Calibre v9.3_2.5, using annular optical illumination with λ=248 nm and NA=0.7. The printed image of the cell is then calculated using dense simulation in Calibre. FIG. 9 is an image of a cell layout 900 of the generic AND2X6 cell with simulated printed gate-lengths 905 for all devices in the cell. Gate-length $L_{Gate}$ is measured for every device in the cell, for both biased and unbiased versions. Table 8 shows a comparison of the printed gate-lengths for biased and unbiased versions of the seven NMOS and PMOS devices labeled in FIG. 9. The unbiased ideal gate-length is 130 nm while the biased ideal is 138 nm. As expected, biased and unbiased gate-lengths are highly correlated and track each other well. There are some outliers that may be due to the relative simplicity of the OPC model used. High correlation between printed dimensions of biased and unbiased versions of the cells implies that the benefits of gate-length biasing estimated using drawn dimensions will not be lost after RET application and the manufacturing process.

TABLE 8

| Device Number | Gate Length (nm) | | | | | |
|---|---|---|---|---|---|---|
| | PMOS | | | NMOS | | |
| | Unbiased | Biased | Diff. | Unbiased | Biased | Diff. |
| 1 | 128 | 135 | +7 | 129 | 135 | +6 |
| 2 | 127 | 131 | +4 | 126 | 131 | +5 |
| 3 | 127 | 131 | +4 | 127 | 131 | +4 |
| 4 | 124 | 131 | +7 | 126 | 133 | +7 |
| 5 | 124 | 131 | +7 | 124 | 132 | +8 |
| 6 | 124 | 132 | +8 | 124 | 132 | +8 |
| 7 | 127 | 135 | +8 | 127 | 135 | +8 |

Another potentially valuable benefit of slightly larger gate-lengths is the possibility of improved printability. Minimum poly spacing is larger than poly gate-length, so that the process window, which is constrained by the minimum resolvable dimension, tends to be larger as gate-length increases even though poly spacing decreases. Table 9 show the process window improvement with gate-length biasing. In particular, the depths of focus for various values of exposure latitude (ELAT), with the same illumination system as above, for 130 nm and 138 nm lines are shown. The data in Table 9 was obtained using process simulation performed with Prolith v8.1.2, using a CD tolerance of 13 nm.

TABLE 9

| Defocus (μm) | ELAT (%) for 130 nm | ELAT (%) for 138 nm |
|---|---|---|
| −0.2 | 4.93 | 5.30 |
| 0.0 | 6.75 | 7.26 |
| 0.2 | 5.69 | 6.24 |

A number of sources of variation can cause fluctuations in gate-length, and hence in performance and leakage. Up to 20× variation in leakage has been reported in production microprocessors. For leakage, the reduction in variation post-gate-length biasing is likely to be substantial as the larger gate-length is closer to the "flatter" region of the $V_{th}$ vs. $L_{Gate}$ curve. To validate this intuition, the impact of gate-length variation on leakage and performance, both pre- and post-biasing, was studied using a simple worst-case approach. The CD variation budget was assumed to be ±10 nm. The performance and leakage of the test case circuits were measured at the worst-case (WC), nominal (NOM), and best-case (BC) process corners, which focus on gate-length variation. This was done for the DVT-DGL approach in which biasing was done along with dual-$V_{th}$ assignment.

Table 10 shows the reduction in performance (e.g., circuit delay) and leakage power uncertainty with biased gate-length in presence of inter-die variations. The uncertainty spread is specified as a percentage of nominal. The results are given for dual-$V_{th}$, with a gate-length biasing of 8 nm, and show significant reduction in leakage variability. For the seven test cases, up to a 41% reduction in leakage power uncertainty caused by linewidth variation was observed. In general, such large reductions in uncertainty may lead to substantial improvements in manufacturing yield and product cost, potentially outweighing benefits of alternative leakage control techniques. Note that the corner case analysis only models the inter-die component of variation, which typically constitutes roughly half of the total CD variation.

TABLE 10

| Circuit | Unbiased (DVT-SGL) | | | Biased (DVT-DGL) | | | % Spread Reduction |
| --- | --- | --- | --- | --- | --- | --- | --- |
| | BC | WC | NOM | BC | WC | NOM | |
| Circuit Delay (ns) | | | | | | | |
| s9234 | 0.504 | 0.385 | 0.436 | 0.506 | 0.387 | 0.436 | −0.53 |
| c5315 | 0.642 | 0.499 | 0.556 | 0.643 | 0.501 | 0.556 | 0.71 |
| c7552 | 0.559 | 0.433 | 0.485 | 0.559 | 0.433 | 0.485 | 0.46 |
| s13207 | 1.029 | 0.797 | 0.904 | 1.031 | 0.800 | 0.904 | 0.35 |
| c6288 | 2.411 | 1.888 | 2.118 | 2.411 | 1.889 | 2.118 | 0.13 |
| alu128 | 2.631 | 2.045 | 2.305 | 2.640 | 2.053 | 2.306 | −0.10 |
| s38417 | 0.793 | 0.615 | 0.692 | 0.793 | 0.616 | 0.692 | 0.03 |
| Leakage (mW) | | | | | | | |
| s9234 | 0.0591 | 0.1898 | 0.0984 | 0.0467 | 0.1268 | 0.0722 | 38.76 |
| c5315 | 0.2358 | 0.6883 | 0.3772 | 0.2176 | 0.5960 | 0.3391 | 16.38 |
| c7552 | 0.4291 | 1.2171 | 0.6798 | 0.4226 | 1.1825 | 0.6655 | 3.57 |
| s13207 | 0.1036 | 0.3401 | 0.1735 | 0.0807 | 0.2211 | 0.1247 | 40.65 |
| c6288 | 1.2477 | 3.5081 | 1.9733 | 1.2373 | 3.4559 | 1.9517 | 1.85 |
| alu128 | 0.3827 | 1.2858 | 0.6457 | 0.3229 | 0.9641 | 0.5184 | 29.00 |
| s38417 | 0.3526 | 1.1453 | 0.5862 | 0.3038 | 0.8966 | 0.4838 | 25.22 |

Figure 10:
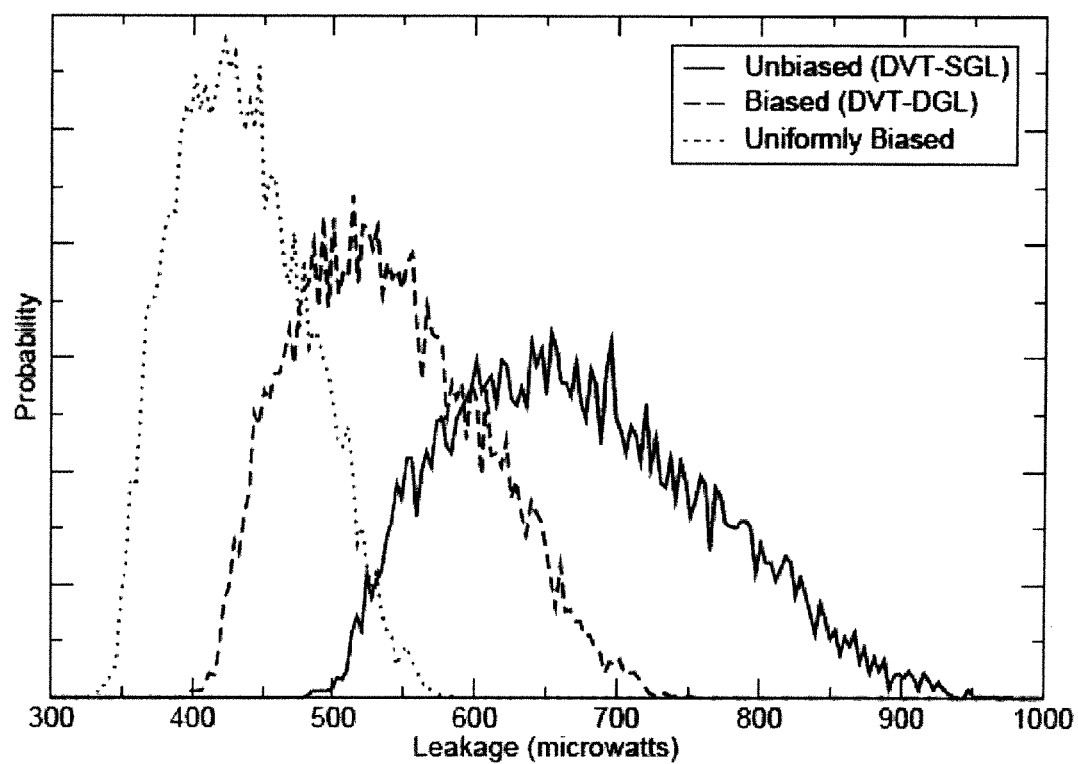
FIG. 10 is a graph of the leakage distributions for the unbiased, technology-level selectively biased, and uniformly biased scenarios for a representative test case.

To assess the impact of both within-die (WID) and die-to-die (DID) components of variation, 10,000 Monte-Carlo simulations with a $\sigma_{WID}=\sigma_{DTD}=3:33$ nm were run. The variations were assumed to follow a Gaussian distribution with no correlations. The results for three dual-$V_{th}$ scenarios were compared: unbiased (DVT-SGL), biased (DVT-DGL), and uniformly biased (when gate-lengths of all transistors in the design were biased by 8 nm). FIG. 10 is a graph of the leakage distributions for the unbiased, technology-level selectively biased, and uniformly biased scenarios for a representative test case. As shown in FIG. 10, the distributions exhibit a "left-shift" with the introduction of biased devices in the design. Also, for uniform biasing, all devices are biased and the circuit delay no longer meets timing.

Table 11 presents the leakage power reductions from TLLB over CLLB. The test cases show up to a 10% reduction in leakage power for TLLB over CLLB. Since TLLB primarily biases devices of unbiased cells, it performs well over CLLB particularly when CLLB does not perform well (i.e., when CLLB leaves many cells unbiased). The leakage savings from TLLB, however, come usually at the cost of increased library size. As described above, the library for TLLB can be composed of all $2^{2n}$ variants of each n-input cell. For the 25 cells in this test case, the library for TLLB was composed of a total of 920 variants. From the small leakage savings at the cost of significantly increased library size, TLLB is primarily more advantageously performed for single- and double-input cells that are frequently used.

TABLE 11

| | | Leakage | | | CPU (s) | |
| --- | --- | --- | --- | --- | --- | --- |
| Circuit | Delay (ns) | CLLB (mW) | TLLB (mW) | Reduction (%) | CLLB (s) | TLLB (s) |
| s9234 | 0.437 | 0.0722 | 0.0712 | 1.41 | 1.86 | 2.75 |
| | 0.447 | 0.0650 | 0.0628 | 3.39 | 1.89 | 2.38 |
| | 0.458 | 0.0609 | 0.0596 | 2.28 | 1.83 | 2.31 |
| c5315 | 0.556 | 0.3391 | 0.3359 | 0.95 | 5.74 | 14.99 |
| | 0.570 | 0.2485 | 0.2368 | 4.71 | 6.21 | 15.29 |
| | 0.584 | 0.1986 | 0.1918 | 3.42 | 6.14 | 13.44 |
| c7552 | 0.485 | 0.6655 | 0.6356 | 4.49 | 10.40 | 43.79 |
| | 0.497 | 0.4478 | 0.4438 | 0.89 | 10.51 | 43.22 |
| | 0.509 | 0.3184 | 0.2993 | 6.02 | 10.55 | 38.90 |

TABLE 11-continued

| | | Leakage | | | CPU (s) | |
| --- | --- | --- | --- | --- | --- | --- |
| Circuit | Delay (ns) | CLLB (mW) | TLLB (mW) | Reduction (%) | CLLB (s) | TLLB (s) |
| s13207 | 0.904 | 0.1247 | 0.1228 | 1.58 | 11.59 | 17.15 |
| | 0.927 | 0.1066 | 0.1055 | 1.08 | 11.73 | 15.62 |
| | 0.949 | 0.1027 | 0.1021 | 0.61 | 11.76 | 14.28 |
| c6288 | 2.118 | 1.9517 | 1.9157 | 1.84 | 79.25 | 305.09 |
| | 2.171 | 1.1880 | 1.1555 | 2.74 | 79.46 | 289.56 |
| | 2.224 | 0.8203 | 0.8203 | 0.00 | 77.28 | 291.44 |
| alu128 | 2.306 | 0.5184 | 0.4857 | 6.31 | 240.09 | 544.75 |
| | 2.363 | 0.4970 | 0.4492 | 9.62 | 262.37 | 609.13 |
| | 2.421 | 0.4497 | 0.4184 | 6.95 | 277.99 | 534.68 |
| s38417 | 0.692 | 0.4838 | 0.4467 | 7.67 | 238.62 | 746.79 |
| | 0.710 | 0.4189 | 0.3982 | 4.93 | 238.99 | 507.62 |
| | 0.727 | 0.4067 | 0.3765 | 7.42 | 234.94 | 525.06 |

Implementations of Gate-Length Biasing Methodology

The general gate-length biasing methodology of the present invention can be applied to a circuit design in many different ways. For example, the mask maker or integrated circuit (IC) fab can implement gate-length biasing via optical proximity correction (OPC). Alternately, the provider of the cell library can offer an enhanced library containing gate-length biased variants of standard cells. As another example, electronic design automation (EDA) tool vendors may implement some or all of gate-length biasing as part of their software design tools (e.g., as part of a design rule checker).

An OPC tool based implementation of the gate-length biasing methodology allows biasing to occur after a layout has been designed. Although the layout is changed after the circuit is designed, the circuit designer preferably uses the optimizations provided by gate-length biasing up front, for example, by using models based on the gate-length biased designs rather than on the nominal designs. OPC implementation of the gate-length biasing methodology allows optimization beyond that achievable by designers in traditional design flows through direct influence of the OPC process, which designers currently cannot do. For example, a biased gate-length of 93 nm, where the nominal gate-length is 90 nm, will reduce leakage. Unfortunately, the traditional combination of OPC and the process cannot guarantee CD control better than a best case/worst case gate-lengths of, for example, 88/98 nm (the "guardband"). An OPC implementation of the gate-length biasing methodology, aware of an optimization goal such as leakage reduction, will guide the OPC process such that it is extremely unlikely for the printed gate-length to be smaller than the 93 nm goal, if there is sufficient timing slack. One benefit of OPC implementation of the gate-length biasing methodology is that optimization is implemented without perturbing a foundry's qualified OPC recipe.

Figure 11:
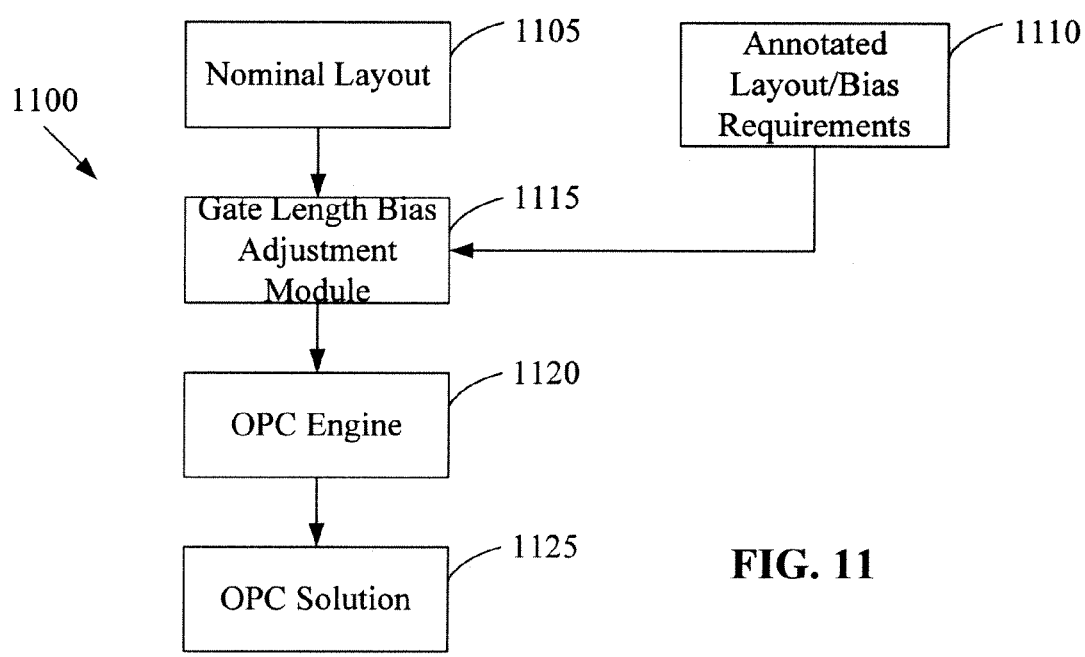
FIG. 11 is a flowchart of an exemplary embodiment of an OPC implementation of the gate-length biasing methodology of the present invention.

FIG. 11 is a flowchart of an exemplary embodiment of an OPC implementation 1100 of the gate-length biasing methodology of the present invention. A nominal layout 1105 for a circuit and an annotated layout or bias requirements 1110 for the layout are provided to a module 1115 that makes changes to the OPC process to implement gate-length biasing. The nominal layout 1105 describes the circuit before biasing, and information describing the bias is contained in the annotated layout or bias requirements 1110. The module 1115 may implement gate-length biasing in many different ways, as will be further described below. Results from the gate-length biasing module 1115 are provided to an OPC engine 1120, such as Calibre or Proteus, which yields an OPC solution 1125 for the gate-length biased layout.

The driver of the OPC engine 1120 of FIG. 11 preprocesses the runscript and the setup files of the OPC tool to enforce design-specific directives in the application of OPC. These directives are usually localized, e.g., on a per-cell or per-device basis. Access to an OPC implementation, such as implementations 1100, offers post-silicon benefits beyond those achievable by optimizations performed during the design flow (e.g., dual gate-length). The expected post-silicon benefit from using an OPC implementation depends on the design, the effort spent on OPC, and the quality of the OPC tool. Following are six embodiments, in order of expected increasing flow implementation effort, that an OPC implementation of the gate-length biasing methodology may provide without significant loss of timing or yield.

First, an exemplary embodiment of an OPC implementation of the gate-length biasing methodology provides a target CD tolerance "knob." In this embodiment, the module 1115 can control the target CD tolerance that the OPC engine aims for, in a device- or feature-specific manner. Conventional OPC flows set a uniform, unsigned tolerance over the entire design. By contrast, this embodiment of the OPC gate-length biasing implementation sets signed, device-specific tolerances. For example, the channel length of a setup-critical gate may only be allowed to decrease from nominal. Channel lengths of other gates with positive setup slack may be allowed only to increase from nominal, while maintaining timing-correctness, to reduce leakage.

For example, in one exemplary approach, the magnitude of the tolerance is changed such that every feature receives the loosest possible tolerance, while respecting foundry-qualified limits and timing correctness. For each feature, this effectively brings the expected error closer to the worst-case error. For example, if a particular gate can increase its channel length by 5 nm without violating timing, there is a leakage power reduction benefit from setting its tolerance closer to 5 nm rather than as tight as possible (e.g., 1 nm) since the looser tolerance effectively shifts the average gate-length to longer lengths. Looser tolerances have the side effect of reducing OPC runtime as well as mask cost.

Second, in another embodiment, an OPC implementation of the gate-length biasing methodology provides an OPC error "knob." In this embodiment, the OPC implementation can control the direction of OPC error. In particular, the OPC implementation can drive OPC for a given gate such that the gate almost always prints with larger channel length than nominal, but still within the tolerance bounds. For example, if the tolerance on a gate-length is set to +/−5 nm, the OPC implementation will drive OPC such that the gate-length is almost always close to +5 nm rather than −5 nm, relative to nominal. The target CD tolerance and OPC error knobs together give an OPC implementation of the gate biasing methodology essentially a continuous range of gate-length variants, applicable on a device-specific basis, without requiring the full design process of cell layout, design rule checking, characterization of performance libraries, etc. For example, implementation of the gate-length biasing methodology at the OPC level avoids violation of across chip linewidth variation (ACLV) tolerances at the design level, which may maximize the optimization possible using OPC.

Third, in another embodiment, an OPC implementation of the gate-length biasing methodology provides an explicit biasing "knob." In this embodiment, the OPC implementation performs explicit biasing of layout CDs. Bias, error magnitude, and error direction are co-optimized to achieve a much finer degree of control and hence favorable optimization, for example, a larger reduction in leakage.

Fourth, in another embodiment, an OPC implementation of the gate-length biasing methodology provides a sub-resolution assist feature (SRAF) insertion "knob." With cooperation of the production OPC group, in this embodiment, the OPC implementation allows set up of alternative SRAF insertion recipes such that the implementation can use them to optimize yield. More precisely, the SRAF insertion can be optimized such that the design remains timing-correct and power is reduced through process variation, specifically, through focus variation. This optimization is generally applied in a device-specific manner.

Fifth, in another embodiment, an OPC implementation of the gate-length biasing methodology provides guardband reduction from knowledge of CD tolerance split. In this embodiment, the OPC implementation can optionally take, if available, the CD tolerance split, for example, from analysis of variance (ANOVA), as an input. This enables the OPC implementation to find out how much of the total technology-specific CD tolerance is attributable to OPC errors. As a result, the OPC implementation can reduce the guardband in its biasing optimization because it drives OPC along with biasing. This gives an OPC implementation more leeway in optimization while still being corner-case timing correct.

Sixth, in another embodiment, an OPC implementation of the gate-length biasing methodology uses out-of-focus process models. In this embodiment, an OPC implementation is aware of iso-dense layout pattern effects arising primarily from focus variation in lithography. Given certain abstractions of out-of-focus process models, if available, the OPC implementation uses its focus- or depth-of-focus (DOF)-aware timing and power analyses to further optimize yield. In particular, because the OPC implementation is layout and process aware, gate-lengths may be selectively biased taking iso-dense effects into account.

Figure 12:
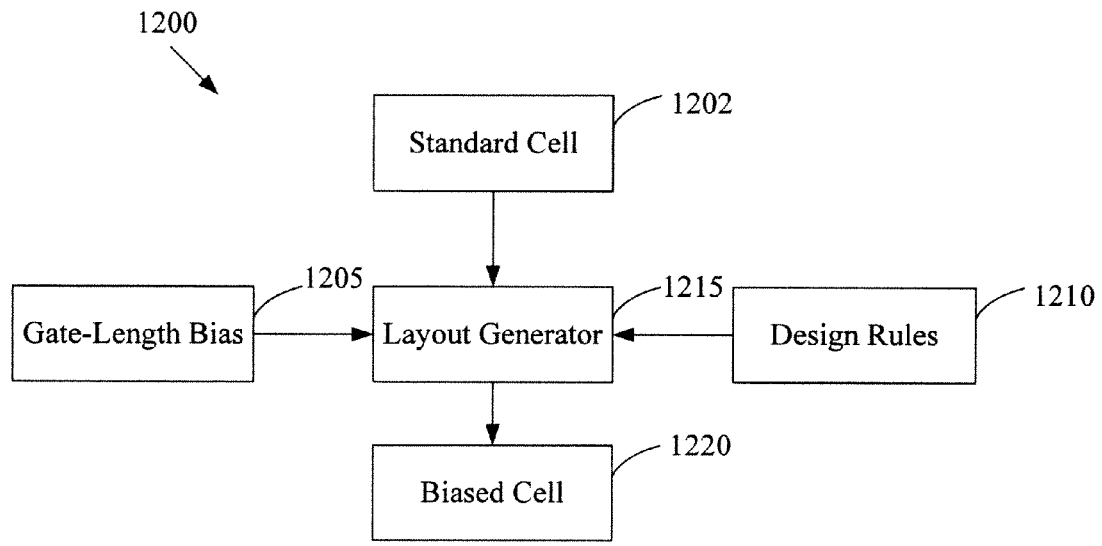
FIG. 12 is a flowchart of an exemplary embodiment of a cell library implementation of the gate-length biasing methodology of the present invention.

Alternatively, the gate-length biasing methodology may be implemented by generating an enhanced cell library available to designers, such that a designer can choose from among nominal cells and their biased variants. FIG. 12 is a flowchart of an exemplary embodiment of a cell library implementation 1200 of the gate-length biasing methodology of the present invention. The layout generator 1215 produces a biased version 1220 of a standard cell 1202. A gate-length bias 1205 is determined and provided to the layout generator 1215, which also receives a set of design rules 1210 for a particular technology. The layout generator 1215, for example, Prolific or Cadabra, generates the biased cell(s) 1220. Additionally, manual editing of one or more layouts may also occur. The resulting enhanced library may include standard (i.e., nominal) cell layouts in addition to standard cell layouts to which $L_{Gate}$ biasing has been applied (i.e., biased cells). Commercially available layout generators may be augmented with the functionality described previously (e.g., see FIG. 5) in order to automatically generate biased variants for a particular cell.

The gate-length biasing methodology may have an impact on layout design rules depending on the implementation methodology chosen. For example, cell libraries may have to plan for gate-length biasing by increasing contact to poly spacing, depending on the use model. Making the post-layout to RET flow transparent to the designer may be accomplished, for example, by giving "hints" to the OPC implementation rather than explicit biases or as explicit changes in critical dimensions that are pre-qualified as layout-transparent. These options would generally occur after physical verification, and biases that are not pre-qualified as "safe" by foundry and library teams would generally not be implemented. If, on the other hand, gate-length biasing is done at the cell layout stage, then contact-to-poly spacing may need to be increased to be DRC correct. A mix of the two approaches (i.e., post- and pre-final layout) could potentially achieve even greater improvements because it is possible to bias OPC errors.

Figure 13:
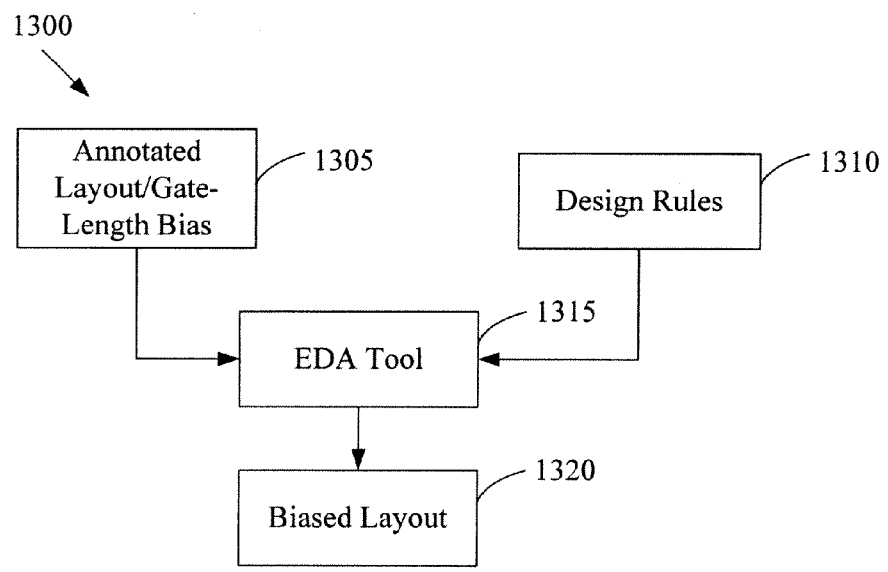
FIG. 13 is a flowchart of an exemplary embodiment of an EDA tool implementation of the gate-length biasing methodology of the present invention.

Alternatively, the gate-length biasing methodology may be implemented at the EDA tool level, for example, as part of a design rule checking tool. FIG. 13 is a flowchart of an exemplary embodiment of an EDA tool implementation 1300 of the gate-length biasing methodology of the present invention. An annotated layout or gate-length bias 1305 to be implemented for a subset of devices is provided to an EDA tool 1315, such as Calibre, Hercules, Diva, or Assurer. EDA tool 1315 also receives a set of design rules 1310 and generates a biased layout 1320 of the design, for example using the methodologies described previously.

Figure 14:
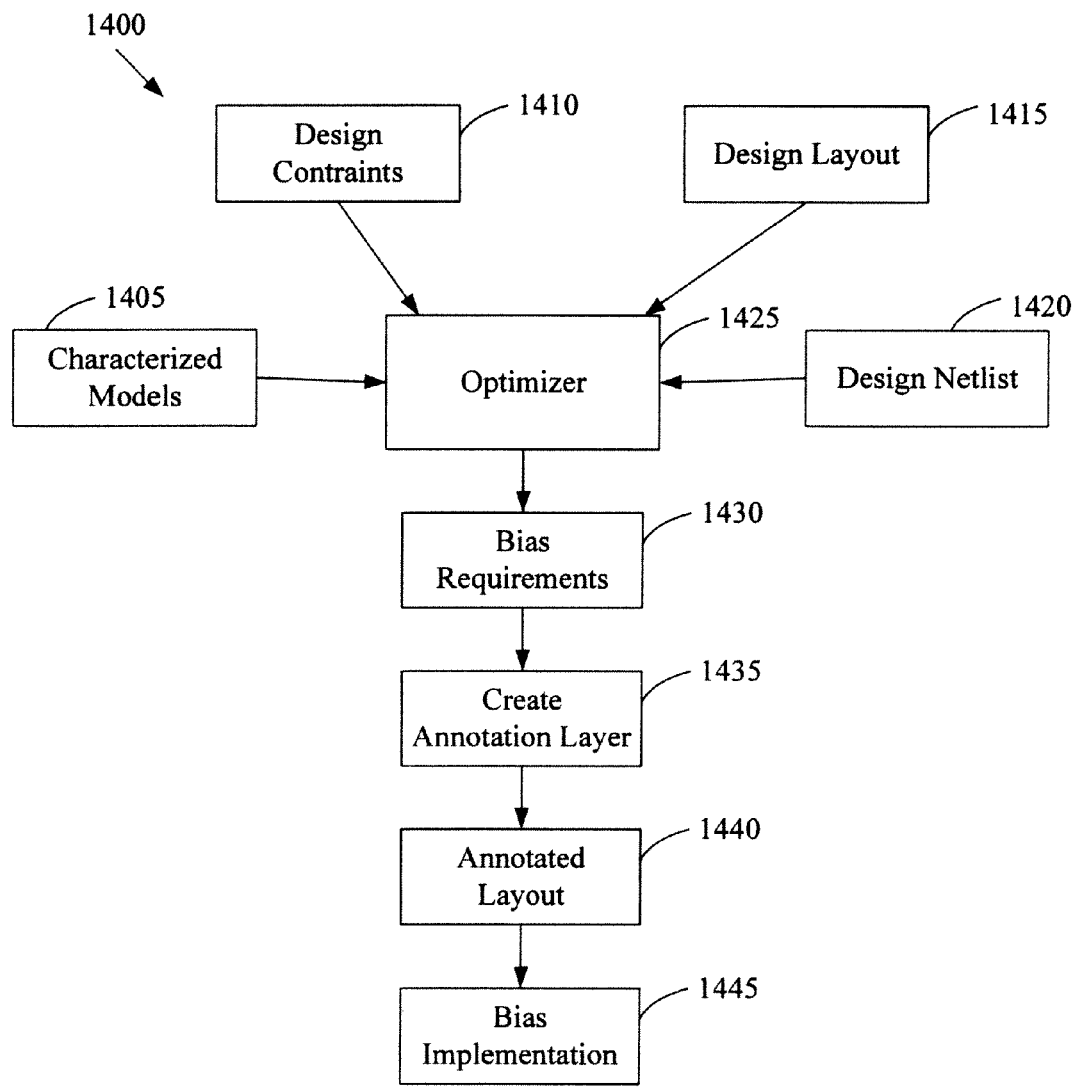
FIG. 14 is a flowchart of an exemplary embodiment of a bias requirement communication methodology of the present invention.

As shown in FIG. 13, an annotated layout or gate-length bias 1305 is provided as part of EDA implementation 1300. Similarly, as shown in FIG. 11, an annotated layout or gate-length bias requirements 1110 are also provided as part of OPC implementations 1100. These bias requirements must be communicated to the OPC or EDA tools. FIG. 14 is a flowchart of an exemplary embodiment of a bias requirement communication methodology 1400, for example, for the OPC or EDA implementations 1100 and 1300, of FIGS. 11 and 13. An optimizer 1425 receives a variety of inputs, including, for example, a set of characterized models 1405, a set of design constraints 1410, a design layout 1415, and a design netlist 1420. The characterized models 1405 may include, for example, a timing library. The design constraints 1410 may include, for example, timing, power, yield, and other constraints. The optimizer 1425 uses the inputs to generate bias requirements 1430 for devices in the layout. Some of the devices may include a nominal gate-length, while others may include a biased gate-length. In this example, the bias requirement communication methodology 1400 creates an annotation layer 1435 of shapes for every distinct bias solution. For example, the annotation layer may include bias of 2 nm overlaps for all devices or cells requiring a 2 nm bias. The result is an annotated layout 1440, which yields the bias implementation 1445 to provide to the OPC and EDA tools.

In alternate embodiments, the gate-length biasing methodology is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Although the detailed description contains many specifics, these should not be construed as limiting the scope of the invention but merely as illustrating different examples and aspects of the invention. It should be appreciated that the scope of the invention includes other embodiments not discussed in detail above. For example, while the descriptions above were given primarily in the context of increasing gate-lengths in order to reduce leakage power, neither increasing gate-length nor reducing leakage power is a requirement. For example, gate-length biasing can also be used to address other types of power consumption, manufacturability concerns and timing characteristics. In one application, gate-lengths on important timing paths may be reduced in order to reduce timing delays and/or allow an increase in operating frequency (e.g., clock frequency) for the chip.

As another example, positive and negative gate-length biasing can be combined to improve the clock frequency of a chip while still conserving (leakage) power. For example, the devices on the critical timing path can receive negative gate-length biases, thus achieving a speedup at the cost of increased leakage power. At the same time, other devices of the circuit can be slowed down (i.e., positive gate-length biases) to take advantage of the increased timing slack, resulting in an overall reduction in leakage power that more than compensates for the additional leakage power from the negatively-biased devices.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents. Furthermore, no element, component, or method step is intended to be dedicated to the public regardless of whether the element, component, or method step is explicitly recited in the claims.

The invention claimed is:

1. A standard cell library used to design a layout, wherein a processor is used to produce a biased layout from the layout for fabricating a semiconductor device on a wafer, the layout stored on a non-transitory computer readable storage, comprising:
   the layout includes cell layouts from the standard cell library, the cell layouts include a plurality of layers, wherein at least one transistor in at least one cell layout is identified by an annotation layer, and the annotation layer itself identifies gate-length biasing to be applied to the at least one transistor of the at least one cell layout when the processor produces the biased layout, using the annotation layer, after the layout has been designed, wherein the gate-length biasing defines an amount of change to a gate length that is not width-sizing of a gate width of the at least one transistor;
   wherein the amount of change is a positive or a negative amount of change for the gate length, and the amount of change is represented as nanometer values from about 1 nanometer to about 10 nanometers, the gate-length biasing identified by the annotation layer represents design-specific directives that require implementation, and
   wherein fabricating the semiconductor device includes making one or more masks from the biased layout, the fabricating resulting in at least one fabricated feature on the wafer.

2. The standard cell library of claim 1, wherein the cell layout identified by the annotation layer is pin compatible with a cell layout that is not identified by the annotation layer.

3. The standard cell library of claim 2, wherein the cell layout identified by the annotation layer is layout swappable with a cell layout that is not identified by the annotation layer; wherein a poly-pitch of the cell layout identified by the annotation layer is substantially equal to a poly-pitch of the cell layout that is not identified by the annotation layer.

4. The standard cell library of claim 1, wherein gate-length biasing, performed after the layout has been designed is post-layout application of the gate-length biasing, and requires that the gate-length biasing occur after one or more cell layouts are designed to be part of the layout, wherein the biased layout results after gate-length biasing of the layout, the biased layout used for manufacturing at least part of the integrated digital circuit.

5. The standard cell library of claim 1, further comprising, wherein the at least one cell layout in the cell library is a first cell layout that contains at least a first and second transistor, and each of the first and second transistors being identified by the annotation layer, the annotation layer defining a first threshold voltage for the first and second transistor,
   wherein the cell library contains a second cell layout containing at least a third transistor, the second cell layout not identified by the annotation layer,
   wherein the third transistor is defined to have a second threshold voltage, the first threshold voltage being different than the second threshold voltage,
   wherein if the first transistor is defined to be a NMOS transistor then the second transistor is also a NMOS transistor,
   wherein if the first transistor is a PMOS transistor then the second transistor is defined to be a PMOS transistor,
   wherein the annotation layer is defined by one or more annotation layers, or combinations of one or more annotation layers and one or more annotation data.

6. A standard cell library of claim 1, wherein the annotation layer is defined by one or more annotation layers, or combinations of one or more annotation layers and one or more annotation data.

7. A standard cell library of claim 1, wherein the amount of change is selected by shapes in the annotation layer.

8. A chip design layout to be gate-length biased, stored on a non-transitory computer readable storage, comprising
   the chip design layout designed to include at least one cell layout that contains at least one transistor, the chip design layout includes a plurality of layers,
   an annotation layer being one of the plurality of layers, the annotation layer identifying the at least one cell layout of the chip design layout, the annotation layer itself identifies gate-length biasing for the at least one transistor, the gate-length biasing provides for an amount of change to a gate length that is not width-sizing of a gate width of the at least one transistor, wherein gate-length biasing of the chip design layout is performed after the chip design layout has been designed and a result of the gate-length biasing is a biased chip design layout;
   wherein the gate-length biasing identified by the annotation layer represents design-specific directives that require implementation, the biased chip design layout being used to make one or more masks implemented to fabricate at least one feature on a wafer to define an integrated circuit chip.

9. The chip design layout of claim 8, wherein verification of the chip design layout is performed by a design rule checker (DRC) tool on the chip design layout and then the gate-length biasing is performed so that the chip design layout passes verification by the design rule checker (DRC) tool.

10. The chip design layout of claim 8, wherein the amount of change is selected by shapes in the annotation layer.

11. The chip design layout of claim 8, wherein the chip design layout further contains at least a first and second transistor, the first transistor being associated with the annotation layer, the second transistor is not associated with the annotation layer, the annotation layer defining a first threshold voltage for the first transistor, wherein the second transistor is defined to have a second threshold voltage, the first threshold voltage being different than the second threshold voltage, wherein if the first transistor is defined to be an NMOS transistor then the second transistor is also an NMOS transistor, wherein if the first transistor is a PMOS transistor then the second transistor is defined to be a PMOS transistor, wherein the annotation layer is defined by one or more annotation layers, or combinations of one or more annotation layers and one or more annotation data.

12. The chip design layout of claim 8, wherein the annotation layer is defined by one or more annotation layers, or combinations of one or more annotation layers and one or more annotation data.

13. The chip design layout of claim 8, wherein the integrated circuit chip, once manufactured, is part of an electronic product.

14. The chip design layout of claim 8, wherein gate-length biasing, performed after the chip design layout has been designed is a post-layout enhancement to either increase speed or reduce leakage power of the transistors that are gate-length biased.

15. The chip design layout of claim 8,
wherein gate-length biasing, is performed post-layout as an enhancement to either increase speed or reduce leakage power of transistors, and wherein the gate-length biasing does not require a change to a contact placement;
wherein cells of the biased chip design layout remain pin-compatible to cells of the chip design layout.

16. The chip design layout of claim 8, wherein the transistors in cell layouts that are gate-length biased are transistors that are either in or are not in a critical path of the chip design layout.

17. The chip design layout of claim 8, wherein the amount of change is a positive or a negative amount of change for the gate length.

18. The chip design layout of claim 8, wherein the amount of change, when positive, is restricted to slight increases so that pin- and layout-compatibility allows for the gate-length biasing to be performed post-layout of the chip design layout.

19. The chip design layout of claim 18, wherein the slight increases of the amount of change is defined by nanometer values from 1 nanometer to 10 nanometers, wherein the slight increases are a predefined fraction of a gate length of nominal length transistors that have not be gate-length biased.

20. The chip design layout of claim 18, wherein the slight increases of the amount of change is less than about 10% of a gate length of a nominal length transistor that has not be gate-length biased.

21. The chip design layout of claim 8,
wherein the design-specific directives further identify which of a plurality of nominal cell layouts are to be gate-length biased for the chip design layout;
wherein for different chip design layouts the design-specific directives identify different ones of a plurality of nominal cell layouts to be gate-length biased;
wherein identifying which ones of the plurality of nominal cell layouts are to be gate-length biased depends on predefined critical paths in each of the different chip design layouts.

22. A method, comprising:
receiving a chip design layout designed to includes select ones of a plurality of nominal cell layouts and an annotated cell layout, the chip design layout defined by a plurality of layers, wherein the plurality of nominal cell layouts define transistors, each of the plurality of nominal cell layouts defining nominal length transistors, and the annotated cell layout also defines transistors, the annotated cell layout being associated with an annotation layer that identifies a gate-length biasing to be applied to at least one transistor of the annotated cell layout, the gate-length biasing identifies an amount of change for a gate length and not width-sizing of a gate width of the at least one transistor of the annotated cell layout, the annotation layer being used to communicate design-specific directives that require implementation;
using a processor to process the chip design layout, with reference to the annotation layer, to apply the gate-length biasing to the annotated cell of the chip design layout, the processing produces a biased chip design layout, wherein the gate-length biasing is applied post-layout of the received chip design layout; and
using the biased chip design layout to produce one or more masks to manufacture an integrated circuit from a semiconductor wafer.

23. The method of claim 22, wherein the integrated circuit, once manufactured, is made part of an electronic product.

24. The method of claim 22, wherein gate-length biasing, performed post-layout is an enhancement to either increase speed or reduce leakage power of the transistors of the annotated cell.

25. The method of claim 22, wherein gate-length biasing, performed post-layout is an enhancement to either increase speed or reduce leakage power of the transistors of the annotated cell, and wherein the gate-length biasing of the annotated cell does not require a change to a contact placement so that cells of biased chip design layout remain pin-compatible to cells of the chip design layout.

26. The method of claim 22, wherein the transistors of the annotated cell are transistors that do not appear in a critical path of the chip design layout.

27. The method of claim 22, wherein the amount of change, when positive, is restricted to slight increases so that pin- and layout-compatibility allows for the gate-length biasing to be performed post-layout of the chip design layout.

28. The method of claim 27, wherein the slight increases of the amount of change is less than about 10% of a gate length of the nominal length transistors.

29. The method of claim 22, wherein the design-specific directives include identification of particular critical paths of the chip design layout that are to include one or more of the annotated cell layout that are to be gate-length biased.

30. The method of claim 22,
wherein the design-specific directives further identify which of the plurality of nominal cell layouts are to be annotated cell layouts for the chip design layout;
wherein for different chip design layouts the design-specific directives identify different ones of the plurality of nominal cell layouts to be annotated cell layouts;
wherein identifying which ones of the plurality of nominal cell layouts are to be annotated cell layouts depends on predefined critical paths in each of the different chip design layouts.

* * * * *